(12) United States Patent
Isaka et al.

(10) Patent No.: US 9,543,608 B2
(45) Date of Patent: Jan. 10, 2017

(54) SOLID OXIDE FUEL CELL AND MANUFACTURING METHOD AND MANUFACTURING APPARATUS FOR SAME

(71) Applicant: TOTO LTD., Kitakyushu-shi, Fukuoka (JP)

(72) Inventors: Nobuo Isaka, Yokohama (JP); Naoki Watanabe, Chigasaki (JP); Shuhei Tanaka, Chigasaki (JP); Takuya Hoshiko, Kanagawa (JP); Masaki Sato, Fujisawa (JP); Osamu Okamoto, Chigasaki (JP); Shigeru Ando, Odawara (JP); Seiki Furuya, Fujisawa (JP); Yutaka Momiyama, Yokohama (JP); Kiyoshi Hayama, Fujisawa (JP)

(73) Assignee: TOTO LTD., Fukuoka (JP)

( * ) Notice: Subject to any disclaimer, the term of this patent is extended or adjusted under 35 U.S.C. 154(b) by 190 days.

(21) Appl. No.: 14/311,875

(22) Filed: Jun. 23, 2014

(65) Prior Publication Data
US 2015/0004518 A1 Jan. 1, 2015

(30) Foreign Application Priority Data

Jun. 27, 2013 (JP) .................. 2013-135080
Jun. 27, 2013 (JP) .................. 2013-135081

(51) Int. Cl.
*H01M 8/24* (2016.01)
*H01M 8/12* (2016.01)

(52) U.S. Cl.
CPC ....... *H01M 8/12* (2013.01); *H01M 2008/1293* (2013.01); *Y02E 60/521* (2013.01); *Y02E 60/525* (2013.01); *Y02P 70/56* (2015.11)

(58) Field of Classification Search
CPC ...... H01M 8/12; H01M 8/124; H01M 8/1253; H01M 8/126; H01M 2008/1293; B22F 3/00; Y02E 60/521
See application file for complete search history.

(56) References Cited

U.S. PATENT DOCUMENTS

2005/0164067 A1* 7/2005 Ooshima ............. H01M 8/0273
429/433
2015/0093661 A1* 4/2015 Watanabe ............... H01M 8/12
429/410

* cited by examiner

*Primary Examiner* — Raymond Alejandro
(74) *Attorney, Agent, or Firm* — Brinks Gilson & Lione

(57) ABSTRACT

The present invention provides a novel manufacturing method for a solid oxide fuel cell apparatus in which members of the apparatus are joined together with an adhesive, such as a ceramic adhesive. The method implements first and second types of drying and hardening steps. The first type of step may be called a workable hardening step and gives an assembly of members in the solid oxide fuel cell apparatus structural rigidity to go through assembling of the solid oxide fuel cell apparatus. The second type of step may be called a solvent elimination and hardening step and gives the assembled members property to withstand the operation temperature of the solid fuel oxide cell apparatus. The first type of step is performed at a first temperature lower than a second temperature at which the second type of step is performed. The second type of step is performed only after the first type of step is performed at multiple times.

11 Claims, 20 Drawing Sheets

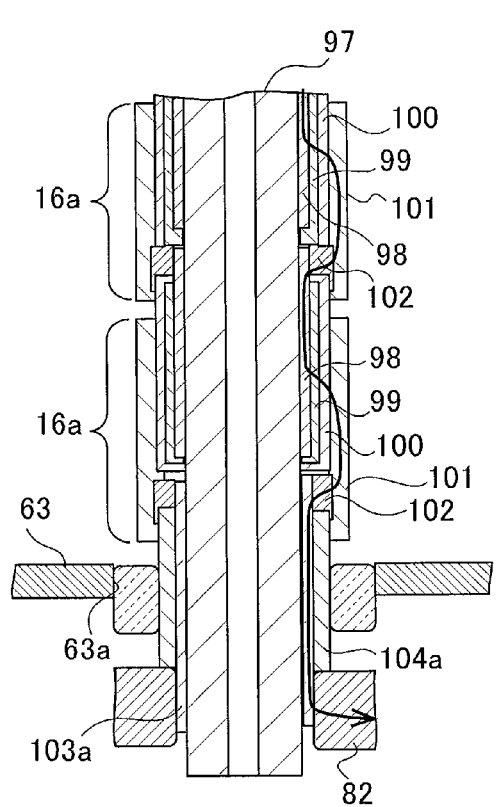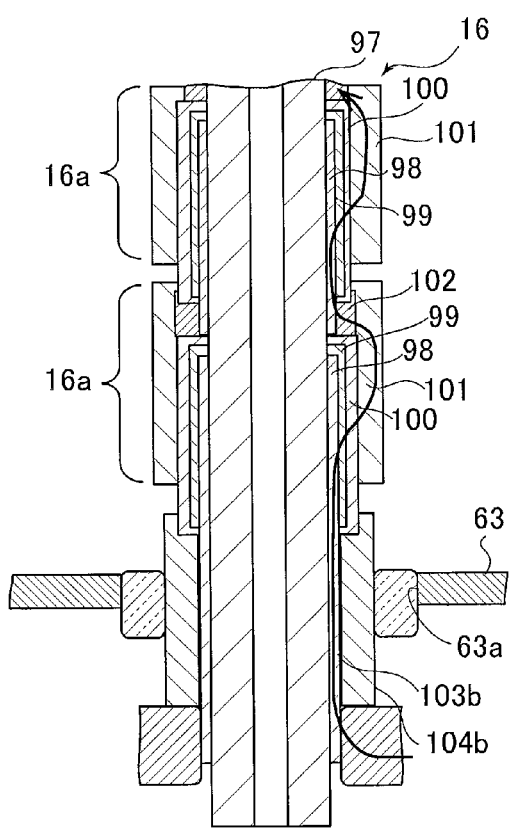

SOLID OXIDE FUEL CELL AND MANUFACTURING METHOD AND MANUFACTURING APPARATUS FOR SAME

RELATED APPLICATIONS

This application claims priority under 35 U.S.C. §119 to Japanese Patent Application Nos. 2013-135080 filed on Jun. 27, 2013 and 2013-135081 filed on Jun. 27, 2013, the entire contents of which are hereby incorporated by reference.

BACKGROUND OF THE INVENTION

1. Technical Field

The invention pertains to a solid oxide fuel cell, and more particularly to a solid oxide fuel cell and manufacturing method and manufacturing apparatus for same.

2. Background Art

Solid oxide fuel cells ("SOFCs" below) are fuel cells which operate at a relatively high temperature in which, using an oxide ion-conducting solid electrolyte as electrolyte, with electrodes attached to both sides thereof, fuel gas is supplied to one side thereof and oxidant gas (air, oxygen, or the like) is supplied to the other side thereof.

A fuel flow path for supplying fuel to fuel cells, and an oxidant gas flow path or the like for supplying oxidant gas such as air, are built into a solid oxide fuel cell, and more particularly into a fuel cell module housing containing fuel cells. Normally these flow paths would be constituted of multiple constituent members, and flow paths are formed by the jointing of each of the constituent products. Since solid oxide fuel cells generally operate at high temperatures of 600 to 1000° C., each of the constituent members must be joined so as to withstand such high temperatures. In addition, airtightness must be secured in the joint portions of each constituent part forming the fuel flow path, the fuel gas flow path, and the like.

Therefore inside the fuel cell module, on joint portions for which airtightness is required between constituent members, methods have been used such as mechanically affixing the constituent members with bolts or the like, then injecting glass in paste form into the joint portion to secure airtightness.

In the fuel cells set forth in Japanese Patent 3894860 (Patent Document 1) and Japanese Published Unexamined Patent Application H6-215782 (Patent Document 2), adhesion of the constituent members in a fuel cell module using ceramic adhesive is described.

PRIOR ART REFERENCES

Patent Documents

Patent Document 1
  Japanese Patent 3894860
Patent Document 2
  Japanese Published Unexamined Patent Application H6-215782

SUMMARY OF THE INVENTION

However, when securing airtightness by injecting glass in paste form into joint portions after mechanically affixing constituent members with bolts or the like, the problem arises that two steps are required for a single location, raising costs as the number of manufacturing processes increases.

In addition, when constituent members are affixed using bolts inside a fuel cell module, chrome components vaporize from the bolts when exposed to high temperatures, causing chrome poisoning of the fuel cells leading to degradation of the cells. The problem can also arise that when sealing is done using glass in order to achieve airtightness at joining portions, boron vaporizes from the glass and causes degradation of the fuel cells by adhering thereto.

On the other hand, with the adhesion method using the ceramic adhesive set forth in Japanese Patent 3894860 and Japanese Published Unexamined Patent Application H6-215782, the aforementioned types of degradation to the fuel cells can be avoided. The problem for conventional joints using ceramic adhesive, however, has been that a reliable seal could not be made between constituent members at the same time that constituent members are affixed to one another.

That is, because solvent such as water vaporize when a ceramic adhesive is dried after being applied, their volume shrinks, and unless this shrinkage is skillfully controlled, peeling and excessive cracking associated with shrinkage occurs in the ceramic adhesive layer after hardening. When such peeling or cracking does occur in the ceramic adhesive layer, sufficient sealing properties cannot be secured in those joint portions even though sufficient adhesion strength may be obtained between constituent members. In order to compensate for these sealing defects, it has been proposed to coat the top of the ceramic adhesive layer with glass after adhesion (Japanese Patent 3894860, Paragraph 0029). However, when a ceramic adhesive layer is coated with glass, the number of manufacturing processes increases and the problem of boron evaporation from the glass occurs, so there is no advantage to using the ceramic adhesive.

Cracks in the ceramic adhesive layer are also prone to occur when adhered ceramic adhesive is suddenly dried. It is therefore possible to avoid cracking by naturally drying adhered ceramic adhesive at room temperature. However, when ceramic adhesive is dried naturally, an extremely long period of time is required until sufficient adhesion strength can be obtained at the joint portion, and during that time material cannot be moved to the next manufacturing process. In general, because a very large number of manufacturing processes is required to assemble a solid oxide fuel cell apparatus, adhesion by ceramic adhesive is completely impractical for industrial applications. Although the use of ceramic adhesives in the assembly of solid oxide fuel cell apparatuses is set forth in patent documents, the fact they have not been put to practical use is believed to result from these causes.

In addition, the present inventors have discovered the new technical problem that when a solid oxide fuel cell apparatus is assembled using ceramic adhesive, then even if the ceramic adhesive hardens to a strength sufficient to withstand practical use and is also able to secure sufficient airtightness for practical use, airtightness in the adhered parts is lost when the fuel cell apparatus is first operated and exposed to high temperatures. That is, even in a state whereby adhered ceramic adhesive is hardened and sufficient airtightness and adhesive strength are obtained, small amounts of moisture or other evaporable solvent remain within the hardened ceramic adhesive layer. In particular, when residual moisture or solvent remain in large amounts in a concentrated form internally, the hardened ceramic adhesive layer is heated at an extremely high speed to temperatures far higher than the temperatures at the time of drying and hardening, therefore the residual moisture or solvent expands volumetrically and evaporates, at which point this expansion, etc. works to cut open the weak portions of the surface part of the already hardened ceramic adhesive layer, creating new cracks. The cause of such losses in airtightness occurring during practical use was ascertained by the inventors.

That is, when ceramic adhesive is used for the assembly of solid oxide fuel cell apparatuses, the fuel cell apparatus cannot withstand the temperature rise in the startup procedure given the state of drying and hardening generally used on ceramic adhesives. To reduce residual moisture or solvent in the interior of the ceramic adhesive layer to a state able to withstand the temperature rise during the startup procedure requires additional time for slow and sufficient drying to occur. For these reasons, extremely long times are required for the assembly of solid oxide fuel cell apparatuses in which ceramic adhesives are used, making their practical use extremely difficult.

Therefore the invention has the object of providing a solid oxide fuel cell apparatus manufacturing method and manufacturing apparatus in which constituent members within a fuel cell module are connected in an airtight manner using ceramic adhesive.

In order to resolve the above-described problems, the invention is a method for manufacturing a solid oxide fuel cell apparatus for generating electricity by supplying fuel and oxidant gas to fuel cells housed in a fuel cell module, comprising steps of: an adhesive application step for applying ceramic adhesive to joint portions of constituent members so that flow path carrying fuel or oxidant gas inside the fuel cell module are formed in an airtight manner; and a drying and hardening step for drying the applied ceramic adhesive; wherein the drying and hardening step includes: a workable hardening step for hardening the applied ceramic adhesive to a state capable of implementing a next manufacturing process; a solvent elimination and hardening step in which, after multiple repetitions of the adhesive application step and the workable hardening step, solvent remaining within the ceramic adhesive are further eliminated and hardened from the ceramic adhesive which was hardened in all the workable hardening steps, and are dried to a state capable of withstanding the temperature rise in a startup procedure.

In the invention thus constituted, in order to constitute flow path guiding fuel or oxidant gas within the fuel cell module in an airtight manner, ceramic adhesive is adhered to joint portions of constituent members in the adhesive application step. Next, in the workable hardening step, adhered ceramic adhesive is hardened to a state whereby the next manufacturing process can be implemented. The adhesive application step and workable hardening step are repeated multiple times for each joint portion. Moreover, in the solvent elimination and hardening step, ceramic adhesive hardened in each workable hardening step is dried to a state capable of withstanding the temperatures occurring during electrical generation.

In the invention thus constituted, ceramic adhesive applied in the adhesive application step is hardened in the workable hardening step. After the end of the workable hardening step, the ceramic adhesive is hardened to the point that the next manufacturing process can be implemented, but cracks can develop when the solid oxide fuel cell apparatus is operated after being assembled. Thus the next manufacturing process can be implemented in the workable hardening step, but when the temperature is raised for approximately two hours to the electrical generation temperature of 600° C. or greater in the startup procedure when transitioning to an electrical generation operation, a large amount of solvent remains, and in this state sudden volumetric expansion and sudden vaporization of the solvent due to sudden heating in the startup procedure causes cracking, but since it is sufficient to harden only enough so that work in the next step can be performed, the drying and hardening time can be shortened and the transition to the next step can be made in a short time. Also, because drying and hardening takes this form, vaporization of solvent is slow, and there is no risk of cracking. This is a skillful use of the characteristics of ceramic adhesive. Specifically, it was found that if the purpose is only to obtain a hardened state sufficient for the solid oxide fuel cell to perform work, ceramic adhesive can perform this in an extremely short time, whereas if the purpose is to assure strength, prevent cracking, and secure airtightness, the drying and hardening time must be extremely lengthened.

In addition, the adhesive application step and workable hardening step are repeated multiple times. Therefore the workable hardening step is applied multiple times to ceramic adhesive applied in the initial adhesive application step. Thus moisture or solvent inside ceramic adhesive hardened in the process of advancing work in the next step are vaporized a little at a time over a long time period, and the hardened ceramic adhesive approaches a state able to withstand the temperature of electrical generation. Thus cracking prone to create airtightness failures is reliably avoided while working efficiency is increased. Moreover, after multiple iterations of the adhesive application step and the workable hardening step, multiple joint portions hardened in each of the workable hardening steps are dried by the solvent elimination and hardening step. Moisture or solvent remaining inside hardened ceramic adhesive is extremely small in volume due to the solvent elimination and hardening step, and the hardened ceramic adhesive is in a state able to withstand the temperatures of electrical generation. In the present invention, multiple joint portions hardened by multiple workable hardening steps are simultaneously dried until able to withstand the temperature rise of the startup procedure up until the start of electrical generation, therefore constituent members can be joined in an airtight manner while reducing the time required for manufacturing.

In the present invention the solvent elimination and hardening step preferably dries ceramic adhesive at a temperature higher than the workable hardening step.

In the invention thus constituted, the solvent elimination and hardening step dries the ceramic adhesive at a higher temperature than the workable hardening step, therefore the temperature of remaining moisture or water can be raised higher, and remaining moisture or water can be reliably vaporized from the ceramic adhesive. Hence the ceramic adhesive can be dried to a state in which no cracks form even in the startup procedure, when the temperature is raised to a high temperature in a short time. Note that the applied ceramic adhesive passes through at least one iteration of the workable hardening step, therefore even if the ceramic adhesive is dried at a higher temperature than the workable hardening step, the risk of cracking can be sufficiently reduced.

In the invention, the solvent elimination and hardening step preferably dries ceramic adhesive at a temperature higher than the workable hardening step and lower than a temperature inside a generating chamber during electrical generation operation.

In the invention thus constituted, workability can be improved using a workable hardening step with the premise that moisture and solvent remain in large quantities even if the strength of the ceramic adhesive is sufficient. At the same time, by implementing the solvent elimination and hardening step at a lower temperature than the electrical generation temperature, a ceramic adhesive joining method reliably free from excessive cracking can be provided, even with sudden temperature changes caused by a first startup procedure.

In the present invention the solvent elimination and hardening step preferably dries ceramic adhesive at a temperature between 100° C. and 200° C.

In the invention thus constituted, because the solvent elimination and hardening step is at low temperature, sudden volumetric expansion can be suppressed even if there are large amounts of residual water or solvent, and hardening characteristics and airtightness can be reliably secured without the occurrence of cracks. Also, because the solvent elimination and hardening step is conducted at a temperature at which reforming catalyst is not oxidized, a solvent elimination and hardening step can also be applied to fuel cell apparatus assemblies into which reforming catalyst is installed; this can be performed in the final step process, assuring working efficiency.

In the invention, the solvent elimination and hardening step preferably has a drying temperature higher than the workable hardening steps, and raises the temperature to a first temperature greater equal than or close to the generating chamber temperature during electrical generation operation, and rising of a temperature up to the first temperature is accomplished by spending more time than when reaching the first temperature during the startup procedure in normal operation.

It is desirable in the solvent elimination and hardening step that a longer time be expended for raising the temperature up to that of the generating chamber during generating operation than the time spent during a normal startup procedure. The invention thus constituted reliably avoids conditions arising in which cracking is caused by sudden volumetric expansion and resulting vaporization of water or solvent remaining at initial startup due to heating to the temperature range of a first temperature in the manufacturing process.

In the invention the solvent elimination and hardening step preferably performs a first solvent elimination and hardening step for drying ceramic adhesive in a predetermined time at a temperature of 100° C. to 200° C., then performs a second solvent elimination and hardening step in which the temperature is raised to a first temperature by spending more time than the time expended up until reaching the first temperature, and dried until the rate of temperature rise becomes smaller than the rate of temperature rise in the startup procedure.

In the invention thus constituted, it is certain that no excessive cracking resulting in a deleterious loss of airtightness occurs in the initial startup procedure. Specifically, even in a state in which large amounts of water or solvent remain in the workable hardening step, large amounts of water or solvent can be vaporized by the low temperature first solvent elimination step in an environment where only a slow temperature rise occurs, such that volumetric expansion is suppressed, thereby preventing cracking. In this state, even if the temperature of minute amounts of remaining water or solvent is raised to a high temperature, volumetric expansion and vaporization speed can be minimized and cracking suppressed. By adopting this step, it becomes possible to suppress the degree to which the speed of the rise in the generating temperature is slowed, so the cracking risk is ameliorated and productivity can be improved.

In the invention, among the multiple implementations of the workable hardening steps, the workable hardening step implemented at an early time point is preferably shorter in duration than the subsequently implemented workable hardening steps.

Joint portions treated by the initial workable hardening step are treated by more iterations of the workable hardening step than subsequently treated joint portions. Therefore in the invention thus constituted, necessary and sufficient drying and hardening time can be secured even if the initial drying time is shortened, so the risk of cracking can be sufficiently reduced while shortening overall drying and hardening time.

In order to resolve the above-described problems, the invention is a method for manufacturing a solid oxide fuel cell apparatus in which fuel and oxidant gas are supplied to multiple fuel cells housed within a fuel cell module to generate electricity, having: an adhesive application step for applying ceramic adhesive to joint portions of constituent members so that a flow path for guiding fuel or oxidant gas within the fuel cell module is constituted in an airtight manner; a workable hardening step for hardening the ceramic adhesive applied to joint portions to a state permitting implementation of the next manufacturing process; and a solvent elimination and hardening step in which, after multiple repetitions of the adhesive application step and the workable hardening step, ceramic adhesive hardened in the workable hardening step is dried to a state capable of withstanding the temperature rise in the startup procedure; and a workable hardening step is implemented on the joint portions of constituent members other than fuel cells after the workable hardening step on the last-implemented individual workable hardening on cell joint portions, so that multiple iterations of the workable hardening step are applied to cell joint portions, which are the joint portions of each of the fuel cells with other constituent members.

In the invention thus constituted, ceramic adhesive is applied to the joint portions of constituent members by the adhesive application step. Next, ceramic adhesive applied to joint portions is hardened by the workable hardening step to a state permitting the next manufacturing process to be implemented. After these adhesive application and workable hardening steps are repeated multiple times, the ceramic adhesive hardened in the workable hardening step is dried to a state able to withstand the temperature rise in the startup state. Also, because workable hardening steps are implemented on joint portions other than cell joint portions after the workable hardening step on cell joint portions, which are the joint portions of fuel cells with other constituent members, workable hardening steps are applied multiple times to cell joint portions.

In general, because the volume of ceramic adhesive shrinks during drying and hardening, it easy for cracking to occur in the hardened ceramic adhesive layer. To avoid the occurrence of such cracking requires the application of a long time period for hardening. The present inventors discovered that the hardening time for ceramic adhesive required to suppress cracking and maintain airtightness is longer than the hardening time required to obtain necessary adhesive strength. Here the airtightness of the cell joint portions between fuel cells and other constituent members is particularly important; fuel leaks from these cell joint portions result in fuel flowing into the oxidant gas side electrode side, which can cause anomalous combustion inside the fuel cell module. An inflow of fuel to the oxidant gas electrode side results in enormous degradation of the oxidant gas side electrode, and damage to fuel cells.

In the invention, the adhesive application step and workable hardening step are preferably repeated multiple times.

Therefore multiple iterations of the workable hardening step are carried out on the ceramic adhesive applied in the initial adhesive application step. Moisture or solvent within the hardened ceramic adhesive is thus gradually vaporized, and the ceramic adhesive approaches a state capable of withstanding the temperature rise in the startup procedure. After multiple iterations of the adhesive application step and the workable hardening step, multiple joint portions hardened in each of the workable hardening steps are dried by the solvent elimination and hardening step. Hardened moisture or solvent remaining inside ceramic adhesive is extremely small in volume due to the solvent elimination and hardening step, and the hardened ceramic adhesive is in a state able to withstand the temperature rise in the startup procedure. In the present invention, multiple joint portions hardened by multiple workable hardening steps are simultaneously dried until able to withstand the temperature rise of the startup procedure, therefore constituent members can be joined in an airtight manner while reducing the time required for manufacturing.

Moreover, in the invention thus constituted a workable hardening step is implemented on joint portions other than the cell joint portions after the workable hardening steps on cell joint portions, for which it is extremely important to secure airtightness. As a result, at least 2 workable hardening steps are applied to cell joint portions, and the risk of cracking in the ceramic adhesive layer at the cell joint portions can be enormously reduced without extending required assembly time.

In this invention, the workable hardening step on the joint portion of constituent members other than fuel cells is preferably performed at least twice, after the last-implemented workable hardening step on the cell joint portion.

In the invention thus constituted, the workable hardening step on joint portions other than the cell joint portions is implemented at least twice after the last workable hardening step on cell joint portions, therefore at least 3 iterations of the workable hardening step are applied to the cell joint portions, and the risk of cracking in the cell joint portions can be made very low.

In the invention the workable hardening step on the cell joint portion is preferably executed during the first half of the multiple iterations of workable hardening steps.

In the invention thus constituted, the workable hardening step on joint portions other than the cell joint portions is executed in first the first half, therefore a large number of workable hardening steps are applied to the cell joint portions, and the risk of cracking in the cell joint portions can be made very low.

In the invention the workable hardening step on the cell joint portion is preferably executed at the start of the multiple iterations of workable hardening steps.

In the invention thus constituted, the workable hardening step on joint portions other than the cell joint portions is executed at the start, therefore the largest number of workable hardening steps are applied to the cell joint portions joined at the start, and the risk of cracking in the cell joint portions can be made very low.

In the present invention the solvent elimination and hardening step is preferably executed only once, after the last-executed workable hardening step.

In the invention thus constituted, the solvent elimination and hardening step is implement just once, therefore all the ceramic adhesive layers hardened in the multiple workable hardening steps to a state capable of implementing the next manufacturing process can, in a single solvent elimination and hardening step, be dried to a state capable of withstanding the temperature rise in the startup procedure, and time required for manufacturing can be greatly reduced.

In this invention, the workable hardening step implemented later than the last-implemented workable hardening step on the cell joint portion is preferably the workable hardening step on constituent members forming flow path carrying oxidant gas or exhaust gas.

In the invention thus constituted, the workable hardening step on the joint portions of constituent members of flow path guiding oxidant gas or exhaust gas is implemented later. In these joint portions, even if cracking occurs in ceramic adhesive layers, or airtightness is insufficient, no degradation of fuel cells or extraordinary reduction in performance is triggered, and time required for manufacturing can be reduced, while avoiding major problems.

The invention is an apparatus for manufacturing a solid oxide fuel cell apparatus for generating electricity by supplying fuel and oxidant gas to fuel cells housed in a fuel cell module, comprising: an adhesive application apparatus that applies ceramic adhesive to the joint portions of constituent members so that flow path carrying fuel or oxidant gas inside the fuel cell module are formed in an airtight manner; a heating apparatus that heats applied ceramic adhesive at a predetermined temperature for a predetermined time; and a heating control apparatus that controls the heating apparatus to execute: (a) a workable hardening step for hardening applied ceramic adhesive to a state capable of implementing the next manufacturing process and, (b) a solvent elimination and hardening step for drying the hardened ceramic adhesive to a state capable of withstanding the temperature during electrical generation, executed after multiple iterations of the workable hardening step.

In the invention thus constituted, a solid oxide fuel cell apparatus can be manufactured in a relatively short time, while sufficiently reducing the risk of cracking.

The present invention is a solid oxide fuel cell apparatus for generating electricity by supplying fuel and oxidant gas to fuel cells housed in a fuel cell module, comprising: a cylindrical generating chamber constituent member open at both ends, housed within the multiple fuel cells; a reforming section formed by disposing a catalyst for steam reforming on the outside perimeter of the generating chamber constituent member; a ring-shaped fuel flow path formed by cylindrical member disposed to surround the reforming section; and a dispersion chamber-forming plate, disposed on the inside of the generating chamber constituent member to form a fuel gas dispersion chamber that distributes fuel supplied from the fuel flow path to the multiple fuel cells; wherein the multiple fuel cells are disposed to respectively penetrate at one end multiple insertion holes formed in the dispersion chamber-forming plate, and are affixed in an airtight manner to the dispersion chamber-forming plate using ceramic adhesive; an exhaust passage constituent member, disposed to cover one end of the generating chamber constituent member and to form a flow path that discharges oxidant gas, affixed in an airtight manner to the outside of the fuel flow path using ceramic adhesive; and a supply passage constituent member, disposed on the outer perimeter of the exhaust passage constituent member, and forming a flow path that supplies oxidant gas between it and the exhaust passage constituent member.

In the solid oxide fuel cell apparatus of the invention thus constituted, multiple fuel cells are housed on the inside of the cylindrical generating chamber-constituent members, which are open at both ends. Multiple fuel cells are affixed by ceramic adhesive in an airtight manner to the dispersion chamber-forming plate, which is disposed on the inside of a generating chamber constituent member. The individual multiple fuel cells are disposed and affixed in such a way that one end penetrates the insertion holes in the dispersion chamber-forming plate, and a fuel gas dispersion chamber for distributing fuel to multiple fuel cells is formed in the dispersion chamber-forming plate. A reforming section is disposed on the outer perimeter of the generating chamber-constituent members, and a ring-shaped fuel flow path is formed by the cylindrical members disposed to surround this reforming section. In addition to covering one end of the generating chamber constituent member, the exhaust passage constituent member is disposed to form a flow path for discharging oxidant gas around the fuel flow path, and is affixed in an airtight manner to the outside of the fuel flow path using ceramic adhesive. Also a supply passage constituent member is disposed around the exhaust passage constituent member, forming a flow path for supplying oxidant gas in the space between it and the exhaust passage constituent member.

According to the invention, an individual fuel cell is affixed to the innermost dispersion chamber-forming plate in the fuel cell module, a fuel flow path is formed on the outside thereof, and outside of that fuel flow path an oxidant gas discharging flow path is formed for discharging oxidant gas, affixed using ceramic adhesive to the exhaust passage constituent member. A workable hardening step on the cell joint portion between the fuel cells and the dispersion chamber-forming plate is first implemented by assembling a fuel cell module from the inside using ceramic adhesive; adhesion by ceramic adhesive of the exhaust passage constituent member to that outer side is implemented later. In the invention thus constituted, the ceramic adhesive hardening step on the cell joint portions with a particular requirement to secure airtightness can be performed multiple times while efficiently executing the assembly of the fuel cell module, and the two goals of efficient assembly and sufficient airtightness can both be achieved.

In addition, the invention is an apparatus for manufacturing a solid oxide fuel cell apparatus for generating electricity by supplying fuel and oxidant gas to fuel cells housed in a fuel cell module, comprising: an adhesive application apparatus that applies ceramic adhesive to the joint portions of constituent members so that flow path carrying fuel or oxidant gas inside the fuel cell module are formed in an airtight manner; a heating apparatus that heats applied ceramic adhesive at a predetermined temperature for a predetermined time; and a heating controller for controlling the heating apparatus; wherein the heating controller controls the heating apparatus to execute: (a) a workable hardening step for hardening ceramic adhesive in cell joint portions, being the joint portion between fuel cells and constituent members, to a state capable of implementing the next manufacturing process; (b) the workable hardening step on joint portions with constituent members other than fuel cells; and (c) a solvent elimination and hardening step, executed after the workable hardening steps, for drying ceramic adhesive hardened by the workable hardening steps to a state capable of withstanding the temperature rise in the startup procedure.

The invention thus constituted executes a workable hardening step on cell joint portions, then a solvent elimination and hardening step on joint portions other than fuel cells, and a solvent elimination and hardening step on dried ceramic adhesive. As a result, multiple iterations of the workable hardening step can be applied to the cell joint portions, while at the same time the solvent elimination and hardening step can be applied to multiple joint portions, and the risk of cracking of the ceramic adhesive in cell joint portions can be extraordinarily reduced.

With the manufacturing method and manufacturing apparatus of the solid oxide fuel cell apparatus of the invention, constituent members inside fuel cell modules can be joined in an airtight manner using ceramic adhesive.

BRIEF DESCRIPTION OF THE DRAWINGS

FIG. 6($a$) is a cross-section showing an expanded view of the bottom end of fuel cells on which the bottom end is a cathode; FIG. 6($b$) A cross-section showing an expanded view of the bottom end of fuel cells on which the bottom end is an anode.

DETAILED DESCRIPTION OF THE PREFERRED EMBODIMENTS

Next, referring to the attached drawings, we discuss a solid oxide fuel cell apparatus (SOFC) according to an embodiment of the present invention.

Figure 1:
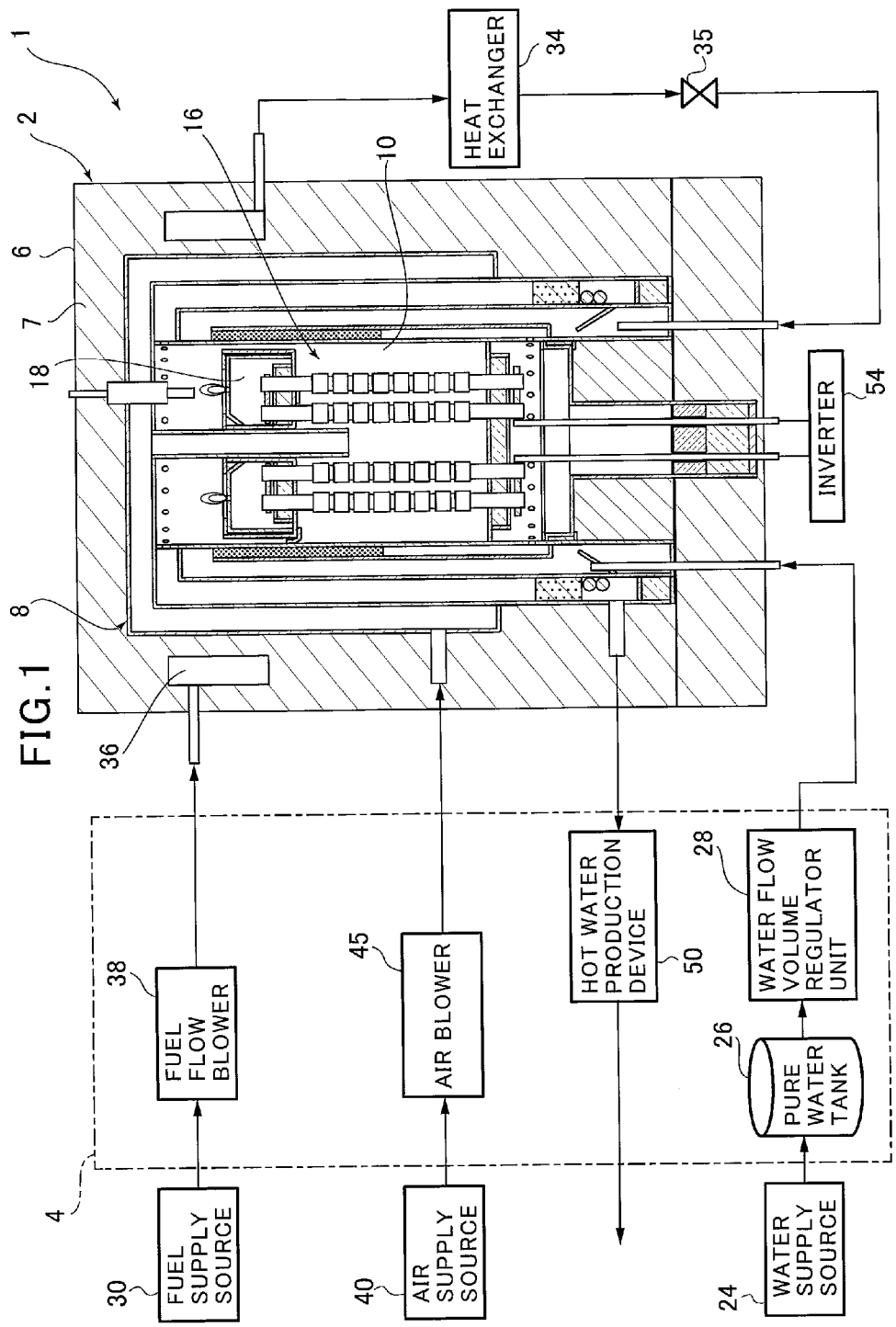
FIG. 1 is an overview schematic showing a solid oxide fuel cell (SOFC) according to an embodiment of the invention.

FIG. 1 is an overview diagram showing a solid oxide fuel cell (SOFC) apparatus according to an embodiment of the present invention. As shown in FIG. 1, the solid oxide fuel cell (SOFC) apparatus of this embodiment of the present invention is furnished with a fuel cell module 2 and an auxiliary unit 4.

Fuel cell module 2 comprises a fuel cell housing container 8; is formed within this housing 6, mediated by thermal insulation 7. A generating chamber 10 is formed on the interior of this fuel cell housing container 8; multiple fuel cells 16 are concentrically disposed within this generating chamber 10, and the generating reaction between fuel gas and air, which is the oxidizing gas, is carried out by these fuel cells 16.

An exhaust collection chamber 18 is attached to the top end of each individual fuel cell 16. Residual fuel (off-gas), unused for the generating reaction and remaining in each individual fuel cell 16, is collected in the exhaust collection chamber 18 attached to the top end and flows out of the multiple jet openings placed in the ceiling surface of exhaust collection chamber 18. Out flowing fuel is combusted in generating chamber 10 using remaining air not used for generation, thereby producing exhaust gas.

Next, auxiliary unit 4 comprises pure water tank 26, which stores water from water supply source 24 and uses a filter to produce pure water, and water flow volume regulator unit 28 (a motor-driven "water pump" or the like), being a water supply apparatus, which regulates the flow volume of water supplied from this pure water tank. Also, auxiliary unit 4 comprises a fuel blower 38 (a motor-driven "fuel pump" or the like), being a fuel supply apparatus, for regulating the flow volume of hydrocarbon raw fuel gas supplied from fuel supply source 30, such as municipal gas.

Note that raw fuel gas which is passed through fuel blower 38 is introduced into the interior of fuel cell housing container 8 through the desulfurizer 36, heat exchanger 34, and electromagnetic valve 35 in fuel cell module 2. The desulfurizer 36 is disposed in a ring shape around fuel cell housing container 8, and operates to remove sulfur from raw fuel gas. Heat exchanger 34 is provided to prevent degradation of electromagnetic valve 35 when high-temperature raw fuel gas heated in desulfurizer 36 flows directly into electromagnetic valve 35. Electromagnetic valve 35 is provided in order to stop the supply of raw fuel gas into fuel cell housing container 8.

Auxiliary unit 4 comprises a generating air flow regulator unit 45 (a motor driven "air blower" or the like), being an oxidant gas supply apparatus, for regulating the flow volume of air supplied from air supply source 40.

In addition, auxiliary unit 4 is equipped with a hot water production device 50 for recovering the heat in exhaust gas from fuel cell module 2. Tap water is supplied to hot water production device 50; this tap water is converted to hot water by the heat from exhaust gas, and is supplied to an external hot water tank, not show.

In addition, connected to fuel cell module 2 is an inverter 54, being a power extraction section (power conversion section) for supplying electricity generated by fuel cell module 2 to the outside.

Figure 2:
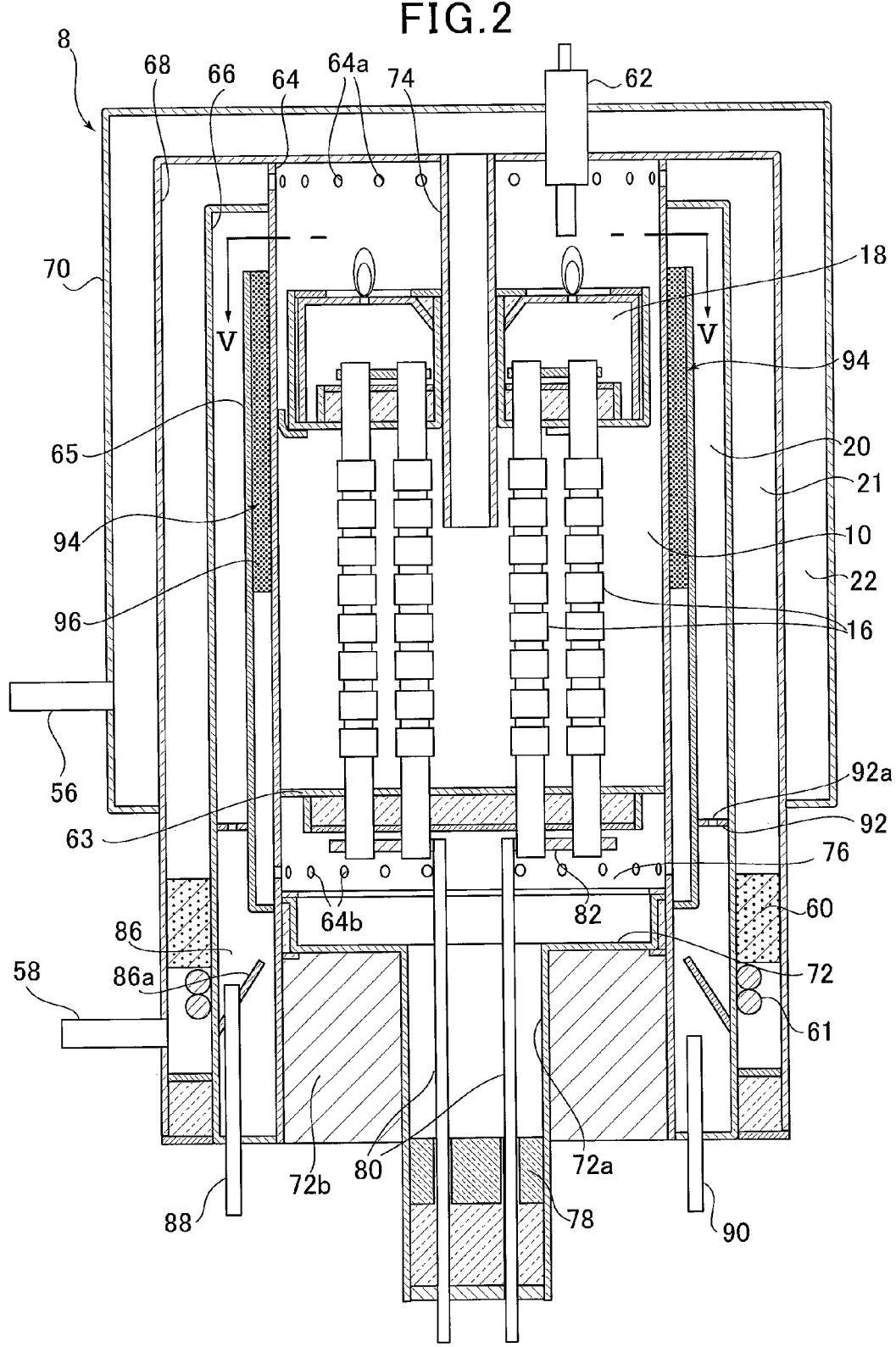
FIG. 2 is a cross-section of a housing container for fuel cells in a solid oxide fuel cell according to an embodiment of the invention.
Figure 3:
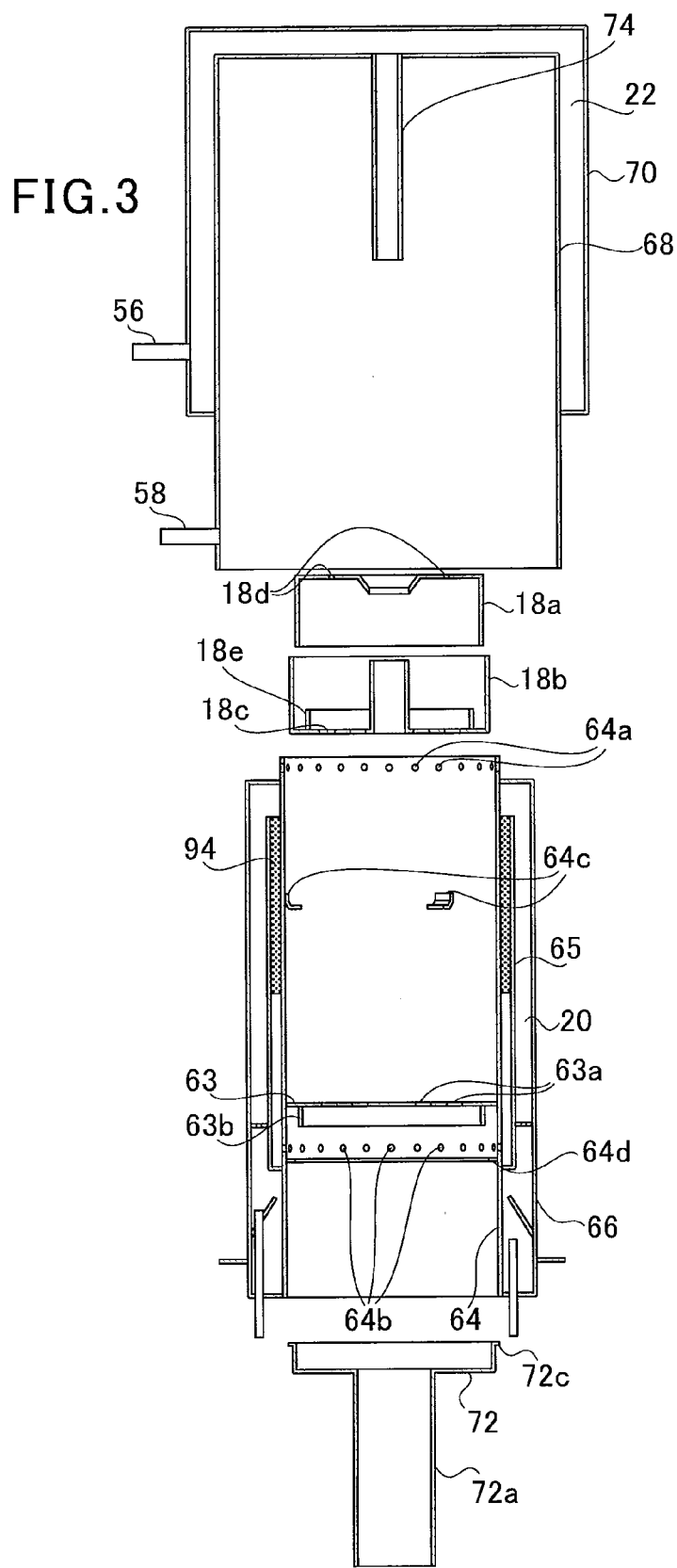
FIG. 3 is a cross-section showing an exploded view of the main members of a housing container for fuel cells in a solid oxide fuel cell according to an embodiment of the invention.

Next, referring to FIGS. 2 and 3, we explain the internal structure of a fuel cell housing container built into the fuel cell module of a solid oxide fuel cell (SOFC) according to an embodiment of the invention. FIG. 2 is a cross-section of a fuel cell housing container, and FIG. 3 is a cross-section showing exploded view of main members of a fuel cell housing container.

As shown in FIG. 2, multiple fuel cells 16 are concentrically arrayed in the space within fuel cell housing container 8, and fuel gas supply flow path 20, exhaust gas discharge flow path 21, and oxidant gas supply flow path 22 are concentrically arranged in that order so as to surround the periphery thereof. Here, exhaust gas discharge flow path 21 and oxidant gas supply flow path 22 function as an oxidant gas flow path for supplying/discharging oxidant gas.

First, as shown in FIG. 2, fuel cell housing container 8 is an approximately cylindrical steel container, to the side surface of which are connected a oxidant gas introducing pipe 56, being an oxidant gas introduction port for supplying generating air, and exhaust gas exhaust pipe 58 for discharging exhaust gas. In addition, an ignition heater 62 for igniting residual fuel flowing out from exhaust collection chamber 18 protrudes from the top in surface of fuel cell housing container 8.

As shown in FIGS. 2 and 3, within fuel cell housing container 8, inside cylindrical member 64, external cylindrical member 66, inside cylindrical container 68, and external cylindrical container 70, being constituent members of the generating chamber, are disposed in that order starting from the inside so as to surround the periphery of exhaust collection chamber 18. The above-described fuel gas supply flow path 20, exhaust gas discharge flow path 21, and oxidant gas supply flow path 22 respectively constitute flow path between the cylindrical members and cylindrical containers, wherein heat exchange is carried out between adjacent flow paths. That is, exhaust gas discharge flow path 21 is disposed so as to surround fuel gas supply flow path 20, and oxidant gas supply flow path 22 is disposed so as to surround exhaust gas discharge flow path 21. The open space at the bottom end of fuel cell housing container 8 is blocked off by dispersion chamber bottom member 72, which forms the bottom surface of fuel gas dispersion chamber 76 for dispersing fuel into each individual fuel cell 16.

The inside cylindrical member 64 is an approximately cylindrical hollow body, the top and bottom ends of which are open. First affixing member 63, being a dispersion chamber-forming plate, is welded in an airtight manner to the interior wall surface of inside cylindrical member 64. A fuel gas dispersion chamber 76 is defined by the bottom surface of this first affixing member 63, the inside wall surface of inside cylindrical member 64, and the top surface of dispersion chamber bottom member 72. Multiple insertion holes 63a, into which fuel cells 16 are inserted, are formed on first affixing member 63, and each individual fuel cell 16 is adhered to first affixing member 63 by ceramic adhesive, with the fuel cells 16 inserted into each of the insertion holes 63a. Thus in a solid oxide fuel cell apparatus 1 of the embodiment, ceramic adhesive is filled into the mutual joining portions between members constituting fuel cell module 2, and with hardening, each of the members is mutually joined in an airtight manner.

External cylindrical member 66 is a cylindrical pipe disposed on the periphery of inside cylindrical member 64, formed in an approximately analogous shape to inside cylindrical member 64 so that a ring-shaped flow path is formed between external cylindrical member 66 and inside cylindrical member 64. In addition, an intermediate cylindrical member 65 is disposed between inside cylindrical member 64 and external cylindrical member 66. Intermediate cylindrical member 65 is a cylindrical pipe disposed between inside cylindrical member 64 and external cylindrical member 66, and a reforming section 94 is constituted between the outside circumferential surface of inside cylindrical member 64 and the inside circumferential surface of intermediate cylindrical member 65. Also, the ring-shaped space between the outer circumferential surface of intermediate cylindrical member 65 and the inner circumferential surface of external cylindrical member 66 functions as a fuel gas supply flow path 20. Therefore reforming section 94 and fuel gas supply flow path 20 receive the heat from combustion of residual fuel at the top end of exhaust collection chamber 18 in the fuel cells 16. The top end of inside cylindrical member 64 and top end of external cylindrical member 66 are joined in an airtight manner by welding, while the top end of fuel gas supply flow path 20 is closed off. Also, the bottom end of intermediate cylindrical member 65 and the outer peripheral surface of inside cylindrical member 64 are joined in an airtight manner by welding.

Inside cylindrical container 68 is a cup-shaped member with a circular cross section disposed on the periphery of external cylindrical member 66, the side surface of which is formed in an approximately analogous shape to external cylindrical member 66, so that a ring-shaped flow path of an essentially fixed width is formed between inside cylindrical container 68 and external cylindrical member 66. This inside cylindrical container 68 is disposed so as to cover the open portion at the top end of inside cylindrical member 64. The ring-shaped space between the outer circumferential surface of external cylindrical member 66 and the inner circumferential surface of inside cylindrical container 68 functions as exhaust gas discharge flow path 21 (FIG. 2). This exhaust gas discharge flow path 21 communicates with the space on the inside of inside cylindrical member 64 through multiple small holes 64a provided on the top in surface of inside cylindrical member 64. An exhaust gas exhaust pipe 58, being an exhaust gas outflow opening, is connected to the bottom surface of inside cylindrical container 68, and exhaust gas discharge flow path 21 communicates with exhaust gas exhaust pipe 58.

A combustion catalyst 60 and sheath heater 61 for heating same is disposed at the bottom portion of exhaust gas discharge flow path 21.

Combustion catalyst 60 is a catalyst filled into the ring-shaped space between the outer circumferential surface of external cylindrical member 66 and the inner circumferential surface of inside cylindrical container 68, above exhaust gas exhaust pipe 58. By passing through combustion catalyst 60, carbon monoxide is removed from exhaust gas descending the exhaust gas discharge flow path 21 and discharged from exhaust gas exhaust pipe 58.

Sheath heater 61 using electrical heater attached so as to surround the outer circumferential surface of external cylindrical member 66 underneath combustion catalyst 60. When solid oxide fuel cell apparatus 1 is started, combustion catalyst 60 is heated to an activation temperature by turning on electricity to sheath heater 61.

External cylindrical container 70 is a cup-shaped member with a circular cross section disposed on the periphery of inside cylindrical container 68, the side surface of which is formed in an approximately analogous shape to inside cylindrical container 68, so that a ring-shaped flow path of an essentially fixed width is formed between external cylindrical container 70 and inside cylindrical container 68. The ring-shaped space between the outer circumferential surface of inside cylindrical container 68 and the inner circumferential surface of external cylindrical container 70 functions as oxidant gas supply flow path 22. Oxidant gas introducing pipe 56 is connected to the bottom end surface of external cylindrical container 70, and oxidant gas supply flow path 22 communicates with oxidant gas introducing pipe 56.

Dispersion chamber bottom member 72 is an approximately plate-shaped member, affixed in an airtight manner with ceramic adhesive to the inside wall surface of inside cylindrical member 64. A fuel gas dispersion chamber 76 is thus constituted between first affixing member 63 and dispersion chamber bottom member 72. Also, insertion pipe 72a for the insertion of bus bars 80 (FIG. 2) is provided at the center of dispersion chamber bottom member 72. Bus bars 80, electrically connected to each individual fuel cell 16, are drawn out to the outside of fuel cell housing container 8 through this insertion pipe 72a. Ceramic adhesive is filled into insertion pipe 72a, thereby securing the airtightness of exhaust gas collection chamber 78. In addition, thermal insulation 72b (FIG. 2) is disposed around the periphery of insertion pipe 72a.

A circular cross section oxidant gas jetting pipe 74 for jetting generating air is attached so as to hang down from the ceiling surface of inside cylindrical container 68. This oxidant gas jetting pipe 74 the extends in the vertical direction on the center axial line of inside cylindrical container 68, and each individual fuel cell 16 is disposed on concentric circles around oxidant gas jetting pipe 74. By attaching the top end of oxidant gas jetting pipe 74 to the ceiling surface of inside cylindrical container 68, oxidant gas supply flow path 22, formed between inside cylindrical container 68 and external cylindrical container 70, is made to communicate with oxidant gas jetting pipe 74. Air supplied via oxidant gas supply flow path 22 is jetted downward from the tip of oxidant gas jetting pipe 74, hitting the top surface of first affixing member 63 and spreading to the entire interior of generating chamber 10.

Fuel gas dispersion chamber 76 is a cylindrical airtight chamber, constituted between first affixing member 63 and dispersion chamber bottom member 72, on the top surface of which each individual fuel cell 16 is closely arrayed. The inside fuel electrode of each individual fuel cell 16 attached to the top surface of first affixing member 63 communicates with the interior of fuel gas dispersion chamber 76. The bottom end of each individual fuel cell 16 penetrates the insertion holes 63a in first affixing member 63 and protrudes into fuel gas dispersion chamber 76, so that each individual fuel cell 16 is affixed by adhesion to first affixing member 63.

As shown in FIG. 2, multiple small holes 64b are formed in inside cylindrical member 64 below first affixing member 63. The space between the outer perimeter of inside cylindrical member 64 and the inner perimeter of intermediate cylindrical member 65 communicates with the inside of fuel gas dispersion chamber 76 through multiple small holes 64b. Supplied fuel first rises through the space between the inside perimeter of external cylindrical member 66 and the outside perimeter of intermediate cylindrical member 65, then descends through the space between the outside perimeter of inside cylindrical member 64 and the inside perimeter of intermediate cylindrical member 65, flowing into fuel gas dispersion chamber 76 through the multiple small holes 64b. Fuel gas which has flowed into fuel gas dispersion chamber 76 is distributed to each individual fuel cell 16 attached to the ceiling surface of fuel gas dispersion chamber 76 (first affixing member 63).

Figure 4:
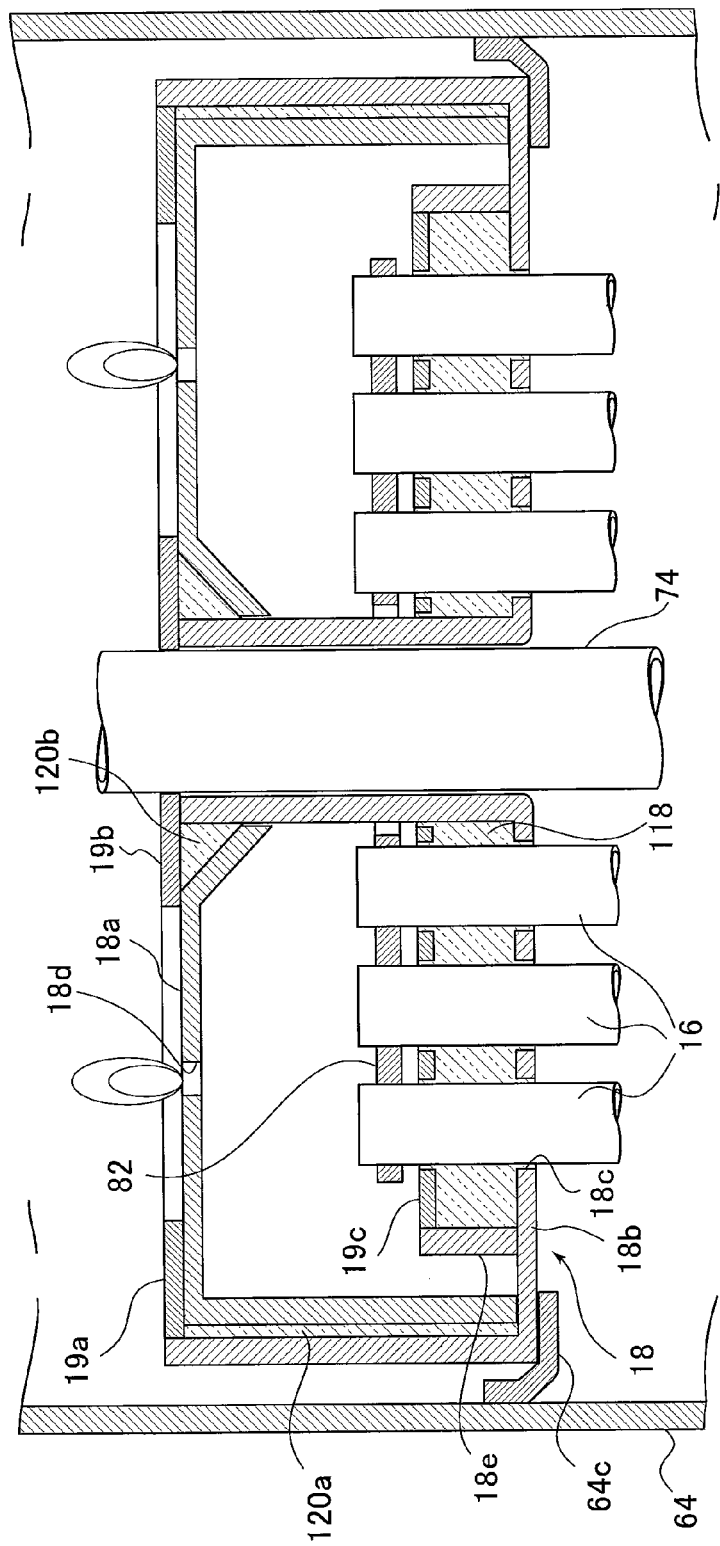
FIG. 4 is a cross-section showing an expanded view of an exhaust collecting chamber built into a solid oxide fuel cell according to an embodiment of the invention.

In addition, the bottom ends of each individual fuel cell 16 protruding into fuel gas dispersion chamber 76 are electrically connected to bus bars 80 inside fuel gas dispersion chamber 76, and electoral power is extracted to the outside through insertion pipe 72a. Bus bars 80 are elongated metal conductors for extracting power produced by each individual fuel cell 16 to the outside of fuel cell housing container 8, affixed to dispersion chamber bottom member 72 insertion pipe 72a through insulator 78. Bus bars 80 are electrically connected to a power collector 82 attached to each individual fuel cell 16 on the interior of fuel gas dispersion chamber 76. Bus bars 80 are connected to inverter 54 (FIG. 1) on the exterior of fuel cell housing container 8. Note that power collector 82 is also attached to the top and portions of each individual fuel cell 16 protruding into exhaust collection chamber 18 (FIG. 4). Multiple fuel cells 16 are electrically connected in parallel by these top and bottom end electrical power collectors 82, and multiple sets of parallel-connected fuel cells 16 are electrically connected in series, and both ends of these series connections are connected to the respective bus bars 80.

Figure 5:
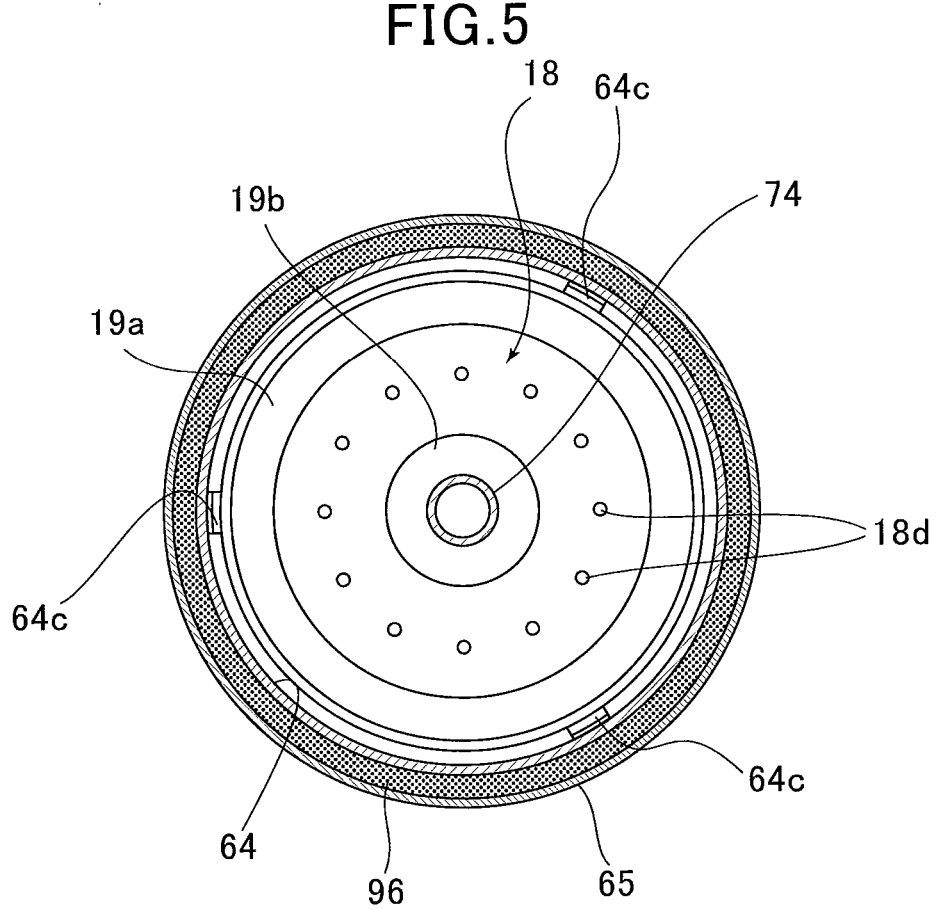
FIG. 5 is a cross section through V-V in FIG. 2.

Next, referring to FIGS. 4 and 5, we explain the constitution of the exhaust collection chamber.

FIG. 4 is a cross-section showing an expanded view of part of the exhaust collection chamber, and FIG. 5 is a cross-section through V-V in FIG. 2.

As shown in FIG. 4, exhaust collection chamber 18 is a chamber with a doughnut-shaped cross-section attached to the top end of each individual fuel cell 16; oxidant gas jetting pipe 74 penetrates and extends at the center of this exhaust collection chamber 18.

As shown in FIG. 5, three stays 64c are attached at equal spacing to the inside wall surface of inside cylindrical member 64 to support exhaust collection chamber 18. As shown in FIG. 4, stays 64c are small tabs of bent thin metal plate; by mounting exhaust collection chamber 18 on each of the stays 64c, exhaust collection chamber 18 is positioned concentrically with inside cylindrical member 64. Thus the gap between the outside circumferential surface of exhaust collection chamber 18 and the inside circumferential surface of inside cylindrical member 64, and the gap between the inside circumferential surface of exhaust collection chamber 18 and the outside circumferential surface of oxidant gas jetting pipe 74 are made uniform around the entire circumference (FIG. 5).

Exhaust collection chamber 18 is constituted by joining collection chamber upper member 18a and collection chamber lower member 18b in an airtight manner.

Collection chamber lower member 18b is a round plate shaped member open at the top, at the center of which a cylindrical portion is provided to permit the penetration of oxidant gas jetting pipe 74.

Collection chamber upper member 18a is a round plate shaped member open at the bottom, at the center of which an opening is provided to permit the penetration of oxidant gas jetting pipe 74. Collection chamber upper member 18a has a shape capable of insertion into the doughnut shaped cross-sectional region which opens at the top of collection chamber lower member 18b.

Ceramic adhesive is filled into and hardened in the gap between the inner circumferential surface of the wall surrounding collection chamber lower member 18b and the outer circumferential surface of collection chamber upper member 18a, assuring airtightness in this joining portion. A large diameter seal 19a is disposed on the ceramic adhesive layer formed by the ceramic adhesive filled into this joint portion, covering the ceramic adhesive layer. The large diameter seal 19a is a ring-shaped thin plate, disposed to cover the filled-in ceramic adhesive layer after the ceramic adhesive is filled, and affixed to exhaust collection chamber 18 by the hardening of the adhesive.

On the other hand, ceramic adhesive is also filled in and hardened between the outside circumferential surface of the cylindrical portion at the center of collection chamber lower member 18b and the edge of the opening portion at the center of collection chamber upper member 18a, assuring the airtightness of this joint portion. A small diameter seal 19b is disposed on the ceramic adhesive layer formed by the ceramic adhesive filled into this joint portion, covering the ceramic adhesive layer. The small diameter seal 19b is a ring-shaped thin plate, disposed to cover the filled-in ceramic adhesive layer after the ceramic adhesive is filled, and affixed to exhaust collection chamber 18 by the hardening of the adhesive.

Multiple insertion holes 18c are formed on the bottom surface of collection chamber lower member 18b. The top ends of each individual fuel cell 16 respectively penetrate each of the insertion holes 18c, and each individual fuel cell 16 penetrate each of the insertion holes 18c. Ceramic adhesive is flowed onto the bottom surface of collection chamber lower member 18b, which is penetrated by fuel cells 16; hardening of the adhesive fills in the gap between the outer perimeter of each individual fuel cell 16 and the insertion holes 18c in an airtight manner and results in the affixing of each individual fuel cell 16 to collection chamber lower member 18b.

Furthermore, round, thin plate cover member 19c is disposed on the ceramic adhesive flowed into the bottom surface of collection chamber lower member 18b and affixed to collection chamber lower member 18b by the hardening of the ceramic adhesive. Multiple insertion holes are formed in cover member 19c at the same positions as each of the insertion holes 18c in collection chamber lower member 18b, and the top end of each individual fuel cell 16 penetrate and extend through these ceramic adhesive layer and cover member 19c.

At the same time, multiple jet openings 18d for jetting collected fuel gas are formed in the ceiling surface of exhaust collection chamber 18 (FIG. 5). Each of the jet openings 18d is disposed in a circle on collection chamber upper member 18a. Fuel remaining unused for electrical generation flows out from the top end of each individual fuel cell 16 into exhaust collection chamber 18, and fuel collected inside exhaust collection chamber 18 flows out from jet openings 18d, where it is combusted.

Next, referring to FIG. 2, we explain the structure for reforming raw fuel gas supplied from fuel supply source 30.

First, vaporization section 86 for vaporizing water for use in steam reforming is provided at the bottom portion of fuel gas supply flow path 20 formed between inside cylindrical member 64 and external cylindrical member 66. Vaporization section 86 comprises ring-shaped inclined plate 86a attached to the lower inside perimeter of external cylindrical member 66, and fuel gas flow path 88. Also, vaporization section 86 is disposed below oxidant gas introducing pipe 56 for introducing generating air, and above exhaust gas exhaust pipe 58 for discharging exhaust gas. Ring-shaped inclined plate 86a is a metal thin plate formed a ring shape, the outer circumferential edge of which is attached to the inside wall surface of external cylindrical member 66. At the same time, the inside perimeter edge of ring-shaped inclined plate 86a is positioned above the outside perimeter edge thereof, and a gap is provided between the inside perimeter edge of inclined plate 86a and the outside wall surface of inside cylindrical member 64.

Water supply pipe 88 is a pipe extending vertically within fuel gas supply flow path 20 from the bottom end of inside cylindrical member 64; water for steam reforming supplied from water flow volume regulator unit 28 is supplied to vaporization section 86 through water supply pipe 88. The top end of water supply pipe 88 extends to the top surface side of inclined plate 86a, penetrating inclined plate 86a, and water supplied to the top surface side of inclined plate 86a pools between the top surface of inclined plate 86a and the inside wall surface of external cylindrical member 66. Water supplied to the top surface of inclined plate 86a is vaporized there, producing steam.

A combustion gas introducing portion for introducing raw fuel gas into fuel gas supply flow path 20 is erected under vaporization section 86. Raw fuel gas fed from fuel blower 38 is introduced into fuel gas supply flow path 20 through fuel gas supply pipe 90. Fuel gas supply pipe 90 is a type extending vertically inside fuel gas supply flow path 20 from the bottom end of inside cylindrical member 64. The top end of fuel gas supply pipe 90 is positioned beneath inclined plate 86a. Raw fuel gas fed from fuel blower 38 is introduced at the bottom side of inclined plate 86a and rises to the top side of inclined plate 86a as its flow path is restricted by the slope of inclined plate 86a. Raw fuel gas rising to the top side of inclined plate 86a rises together with the steam produced by vaporization section 86.

A fuel gas supply flow path partition 92 is erected above vaporization section 86 in fuel gas supply flow path 20. Fuel gas supply flow path partition 92 is a ring-shaped metal plate disposed to separate into top and bottom portions the ring-shaped space between the inside perimeter of external cylindrical member 66 and the outside perimeter of intermediate cylindrical member 65. Multiple equally spaced jet openings 92a are provided in a circle on fuel gas supply flow path partition 92, and the spaces above and below fuel gas supply flow path partition 92 communicate through these jet openings 92a. Raw fuel gas introduced from fuel gas supply pipe 90 and steam produced by vaporization section 86 are first pooled in the space on the bottom side of fuel gas supply flow path partition 92, then passed through each of the jet openings 92a and jetted into the space on the top side of fuel gas supply flow path partition 92. When jetted into the wide space on the top side of fuel gas supply flow path partition 92 from each of the jet openings 92a, the raw fuel gas and steam suddenly decelerate and sufficiently mix here.

In addition, a reforming section 94 is erected on the top portion of the ring shaped space between the inside perimeter of intermediate cylindrical member 65 and the outside perimeter of inside cylindrical member 64. Reforming section 94 is disposed so as to surround the top portion of each individual fuel cell 16 and the perimeter of the exhaust collection chamber 18 at the top thereof. Reforming section 94 comprises a catalyst holding plate (not shown) attached to the outer wall surface of inside cylindrical member 64, and a reforming catalyst 96 held in place thereby.

Thus when raw fuel gas and steam, mixed in the space over fuel gas supply flow path partition 92, makes contact with the reforming catalyst 96 filled into reforming section 94, the steam reforming reaction shown by Eq. (1) proceeds inside reforming section 94.

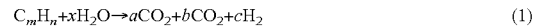

$$C_mH_n + xH_2O \rightarrow aCO_2 + bCO_2 + cH_2 \qquad (1)$$

Fuel gas reformed in reforming section 94 flows downward in the space between the inside perimeter of intermediate cylindrical member 65 and the outside perimeter of inside cylindrical member 64, flowing into fuel gas dispersion chamber 76 to be supplied to each individual fuel cell 16. The steam reforming reaction is an endothermic reaction, however the heat required for the reaction is supplied by the combustion heat of off-gas flowing out from exhaust collection chamber 18 and the emitted heat produced in each individual fuel cell 16.

Next, referring to FIGS. 6(a) and 6(b), we explain fuel cells 16.

In the solid oxide fuel cell apparatus 1 of the embodiment, cylindrical crossbar cells using solid oxides are adopted as the fuel cells 16. Multiple single cells 16a are arranged in crossbar form on each individual fuel cell 16, and an individual fuel cell 16 is constituted by electrically connecting these together in series. Each individual fuel cell 16 comprises an anode (positive electrode) at one end and a cathode (negative electrode) at the other end; of the multiple fuel cells 16, half are disposed so that the top end is an anode and the bottom end is a cathode, and the other half are disposed so that the top end is a cathode and the bottom end is an anode.

FIG. 6 (a) is a cross-section showing an expanded view of the bottom end of fuel cells 16 on which the bottom end is a cathode; FIG. 6(b) is a cross-section showing an expanded view of the bottom end of fuel cells 16 on which the bottom end is an anode.

As shown in FIGS. 6(a) and 6(b), fuel cells 16 are formed from elongated, cylindrical porous support body 97, and multiple layers formed in a crossbar shape on the outside of this porous support body 97. Respectively formed in a crossbar shape surrounding porous support body 97 in the following order, starting from the inside, are: fuel electrode 98, reaction suppression layer 99, solid electrolyte layer 100, and air electrode 101. Therefore fuel gas supplied via fuel gas dispersion chamber 76 flows into the porous support body 97 of each individual fuel cell 16, and air jetted from oxidant gas jetting pipe 74 flows to the outside of air electrode 101. Each of the single cells 16a formed at the top of fuel cells 16 comprises a set made up of a fuel electrode 98, reaction suppression layer 99, solid electrolyte layer 100, and air electrode 101. The fuel electrode 98 in one single cell 16a is electrically connected to the air electrode 101 of the adjacent single cell 16a through interconnector layer 102. By this means, the multiple single cells 16a formed on a single individual fuel cell 16 are electrically connected in series.

As shown in FIG. 6(a), at the cathode-side and portion of fuel cells 16, an electrode layer 103a is formed on the outer perimeter of porous support body 97, and a lead film layer 104a is formed on the outside of this electrode layer 103a. In the cathode-side end, the air electrode 101 and electrode layer 103a of single cells 16a positioned at the end are electrically connected by interconnector layer 102. This electrode layer 103a and lead film layer 104a are formed to penetrate first affixing member 63 at the end of fuel cells 16, and protrude further downward than first affixing member 63. Electrode layer 103a is formed further down than lead film layer 104a, and externally exposed power collector 82 is electrically connected to electrode layer 103a. Thus air electrode 101 of single cell 16a positioned at the end is connected to power collector 82 through interconnector layer 102 and electrode layer 103a, and electrical current flows as shown by the arrow in the diagram. Ceramic adhesive is filled into the gap between the edge of the insertion holes 63a on first affixing member 63 and lead film layer 104a, and fuel cells 16 are affixed to first affixing member 63 on the outer circumference of lead film layer 104a.

As shown in FIG. 6(b), on the individual fuel cell 16 anode side end, a fuel electrode layer 98 in single cell 16a positioned at the end extends, and the extended portion of fuel electrode 98 functions as an electrode layer 103b. Lead film layer 104b is formed on the outside of electrode layer 103b. This electrode layer 103b and lead film layer 104b are formed to penetrate first affixing member 63 at the end of fuel cells 16, and protrude further downward than first affixing member 63. Electrode layer 103b is formed further down than lead film layer 104b, and externally exposed power collector 82 is electrically connected to electrode layer 103b. Thus the fuel electrode 98 of single cell 16a positioned at the end is connected to power collector 82 through integrally formed electrode layer 103b, and electrical current flows as shown by the arrow in the diagram. Ceramic adhesive is filled into the gap between the edge of the insertion holes 63a on first affixing member 63 and lead film layer 104b, and fuel cells 16 are affixed to first affixing member 63 on the outer circumference of lead film layer 104b.

In FIGS. 6 (a) and (b) we explained the constitution of the bottom and portion of each individual fuel cell 16; the top and portion of each individual fuel cell 16 is the same. Note that at the top end each individual fuel cell 16 is affixed to the collection chamber lower member 18b of exhaust collection chamber 18; the structure of the affixing part is the same as affixing to the first affixing member 63 at the bottom end.

Next we explain the constitution of porous support body 97, and of each layer.

The porous support body 97 in the embodiment is formed by extruding and sintering a mixture of forsterite powder and the binder.

In the embodiment, fuel electrode 98 is an electrically conductive thin film comprised of a mixture of NiO powder and 10YSZ (10 mol % $Y_2O_3$-90 mol % $ZrO_2$) powder.

In the embodiment, reaction suppression layer 99 is a thin film comprising cerium compound oxide (LDC 40; i.e., 40 mol % $La_2O_3$-60 mol % $CeO_2$) or the like, by which chemical reactions between fuel electrode 98 and solid electrolyte layer 100 are suppressed. That is, it is a thin film constituted of 40 mol % $La_2O_3$-60 mol % $CeO_2$.

In the embodiment, solid electrolyte layer 100 is a thin film comprising an LSGM powder composition of $La_{0.9}Sr_{0.1}Ga_{0.8}Mg_{0.2}O_3$. Electrical energy is produced by the reaction between oxide ions and hydrogen or carbon monoxide through this solid electrolyte layer 100.

In the embodiment, air electrode 101 is an electrically conductive thin film comprising a powder composition of $La_{0.6}Sr_{0.4}CO_{0.8}Fe_{0.2}O_3$.

In the embodiment, interconnector layer 102 is an electrically conductive thin film comprising SLT (lanthanum doped strontium titanate). Adjacent single cells 16a on fuel cells 16 are connected via interconnector layer 102.

In the embodiment, electrode layers 103a and 103b are formed of the same material as fuel electrode 98.

In the embodiment, lead film layers 104a and 104b are formed of the same material as solid electrolyte layer 100.

Next, referring to FIGS. 1 and 2, we discuss the operation of solid oxide fuel cell apparatus 1.

First, in the startup procedure of solid oxide fuel cell apparatus 1, fuel blower 38 is started, and power to the sheath heater 61 is started at the same time as the supply of fuel is started. By starting the power to sheath heater 61, the combustion catalyst 60 disposed above sheath heater 61 is heated, and vaporization section 86 disposed on the inside thereof is also heated. Fuel supplied by fuel blower 38 flows from fuel gas supply pipe 90 via desulfurizer 36, heat exchanger 34, and electromagnetic valve 35 into the interior of fuel cell housing container 8. In-flowing fuel, after rising up to the top end within fuel gas supply flow path 20, drops down within reforming section 94, then through small holes 64b placed on the bottom portion of inside cylindrical member 64, and into fuel gas dispersion chamber 76. Note that immediately after the of solid oxide fuel cell apparatus 1 startup procedure, because the temperature of reforming catalyst 96 in reforming section 94 has not risen sufficiently, no fuel reforming is performed.

Fuel gas which has flowed into fuel gas dispersion chamber 76 flows through the inside (the fuel electrode side) of each of the fuel cells 16 attached to first affixing member 63 of fuel gas dispersion chamber 76 and into exhaust collection chamber 18. Note that immediately after startup of solid oxide fuel cell apparatus 1, the temperature of each of the solid oxide fuel cell apparatus 1 has not risen sufficiently, or power is not being extracted to inverter 54, therefore no electrical generating reaction is occurring.

Fuel flowing into exhaust collection chamber 18 is jetted from exhaust collection chamber 18 jet openings 18d. Fuel jetted from jet openings 18d is ignited by ignition heater 62 and combusted. Reforming section 94, disposed around exhaust collection chamber 18, is heated by this combustion. Exhaust gas produced by combustion flows into exhaust gas discharge flow path 21 through small holes 64a formed in the top portion of inside cylindrical member 64. High temperature exhaust gas descends the interior of exhaust gas discharge flow path 21, heating fuel flowing in the fuel gas supply flow path 20 disposed on the inside thereof and generating air flowing in the oxidant gas supply flow path 22 disposed on the outside thereof. In addition, exhaust gas passes through the combustion catalyst 60 disposed within exhaust gas discharge flow path 21, whereby carbon monoxide is removed, then passes through exhaust gas exhaust pipe 58 to be discharged from fuel cell housing container 8.

When vaporization section 86 is heated by exhaust gas and sheath heater 61, water for steam reforming supplied to vaporization section 86 is vaporized and steam is produced. Water for steam reforming is supplied by water flow volume regulator unit 28 to vaporization section 86 in fuel cell housing container 8 via water supply pipe 88. When steam is produced by vaporization section 86, fuel supplied through fuel gas supply pipe 90 is first held in the space on the bottom side of fuel gas supply flow path partition 92 inside fuel gas supply flow path 20, then jetted from multiple jet openings 92a formed in fuel gas supply flow path partition 92. Fuel and steam jetted with high force from jet openings 92a are well blended by being decelerated in the space on the top side of fuel gas supply flow path partition 92.

Blended fuel and steam rise up within fuel gas supply flow path 20 and flow into reforming section 94. In a state whereby the reforming section 94 reforming catalyst 96 has risen to a temperature at which reforming is possible, a steam reforming reaction occurs when the mixed gas of fuel and steam passes through reforming section 94, and the mixed gas is reformed into a hydrogen-rich fuel. Reformed fuel passes through small holes 64b and flows into fuel gas dispersion chamber 76. A large number of small holes 64b are formed around fuel gas dispersion chamber 76, and sufficient capacity is thus assured for fuel gas dispersion chamber 76, therefore reformed fuel flows in uniformly to the fuel cells 16 with which it collides in the fuel gas dispersion chamber 76.

At the same time air, which is the oxidant gas supplied by generating air flow regulator unit 45, flows into oxidant gas supply flow path 22 via oxidant gas introducing pipe 56. Air flowing into oxidant gas supply flow path 22 rises up in oxidant gas supply flow path 22 as it is heated by the exhaust gas flowing on the inside thereof. Air rising in oxidant gas supply flow path 22 is gathered at the center of the top end in fuel cell housing container 8 and flows into the oxidant gas jetting pipe 74 which communicates with oxidant gas supply flow path 22. Air flowing into oxidant gas jetting pipe 74 is jetted from the bottom end thereof into generating chamber 10; the jetted air then hits the top surface of first affixing member 63 and spreads throughout the entire generating chamber 10. Air flowing into generating chamber 10 rises up through the gap between the outer perimeter wall of exhaust collection chamber 18 and the inner perimeter wall of inside cylindrical member 64, and through the gap between the inside perimeter wall of exhaust collection chamber 18 and the outside circumferential surface of oxidant gas jetting pipe 74.

At this point, a portion of the air passing over the exteriors (air electrode side) of each individual fuel cell 16 is used for the generating reaction. In addition, a portion of the air rising above exhaust collection chamber 18 is used to combust the fuel jetted from exhaust collection chamber 18 jet openings 18d. Exhaust gas produced by combustion and air not used for electrical generation or combustion passes through small holes 64a and flows into exhaust gas discharge flow path 21. Exhaust gas and air flowing into exhaust gas discharge flow path 21 is discharged after carbon monoxide is removed by combustion catalyst 60.

Thus when each individual fuel cell 16 rises to approximately 650° C. at which generation is possible, and reformed fuel flows into the interior (fuel electrode side) of each individual fuel cell 16 and air flows on the outside (air electrode side) thereof, a starting power is generated by chemical reaction. In this state, when inverter 54 is connected to bus bars 80 drawn out from fuel cell housing container 8, power is extracted from each individual fuel cell 16 and electrical generation is implemented.

In solid oxide fuel cell apparatus 1 of the embodiment, generating air is jetted from the oxidant gas jetting pipe 74 disposed at the center of generating chamber 10 and rises up through generating chamber 10 in the uniform gap between exhaust collection chamber 18 and inside cylindrical member 64 and in the uniform gap between exhaust collection chamber 18 and oxidant gas jetting pipe 74. Therefore the flow of air inside generating chamber 10 is an essentially completely axially symmetrical flow, and air flows homogeneously around each individual fuel cell 16. Temperature differences between fuel cells 16 are thereby suppressed, and a uniform starting power can be produced by each individual fuel cell 16.

Next, referring to FIGS. 7 through 26, we explain a method for manufacturing solid oxide fuel cell apparatus 1 according to an embodiment of the invention.

Figure 24:
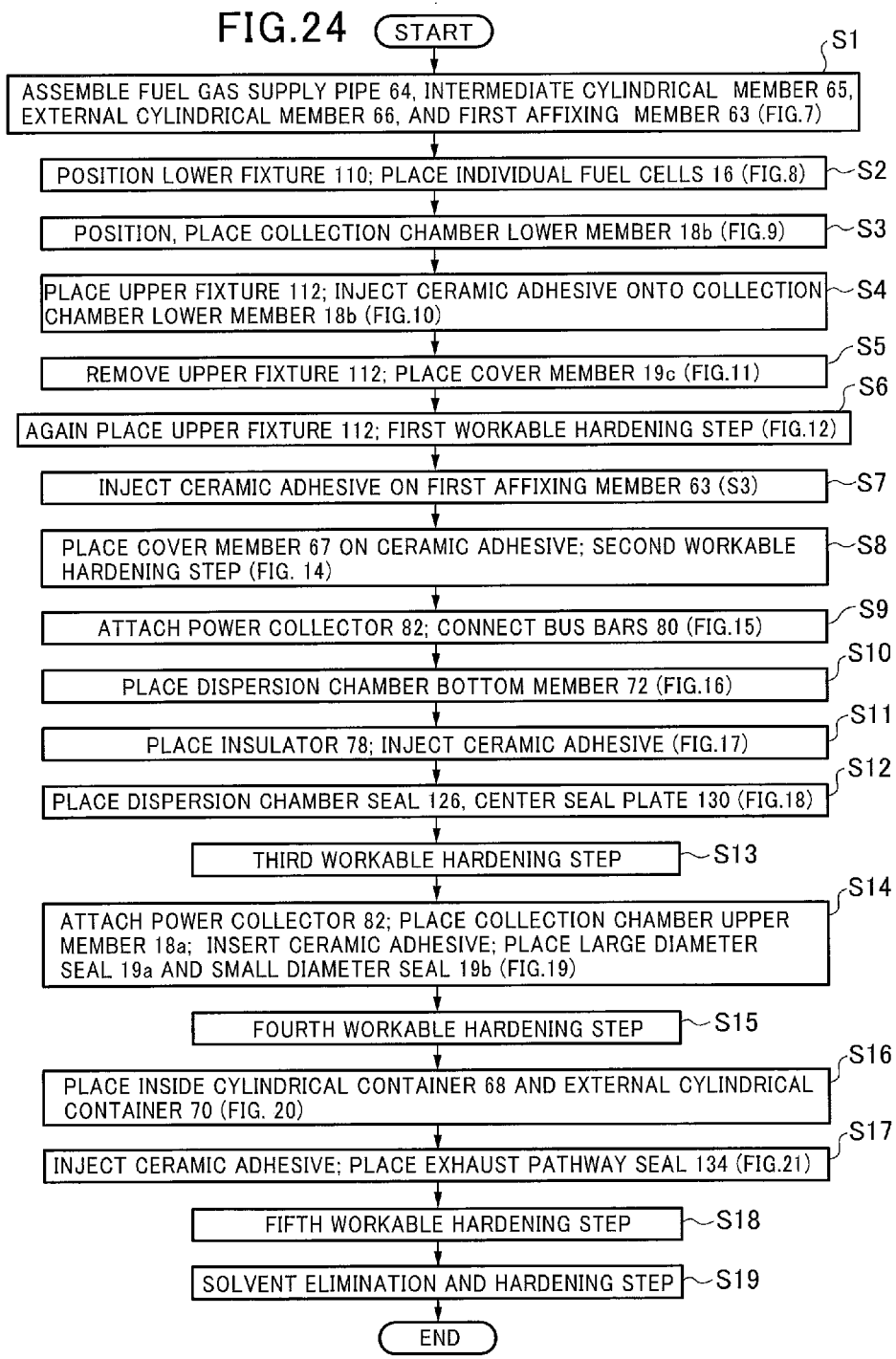
FIG. 24 is a flowchart showing the manufacturing procedure for a solid oxide fuel cell according to an embodiment of the invention.

FIGS. 7 through 21 are schematics showing the procedure for manufacturing solid oxide fuel cell apparatus 1; for explanatory purposes the detailed constitution thereof is omitted. FIG. 24 is a flowchart showing the manufacturing procedure for solid oxide fuel cell apparatus 1.

Figure 7:
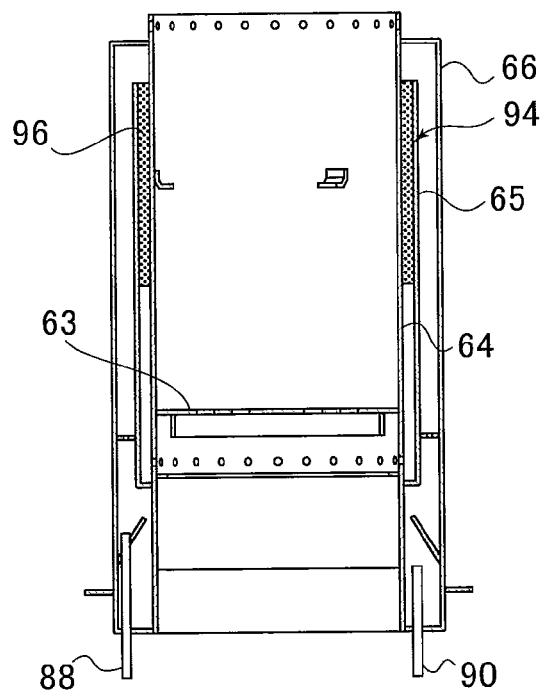
FIG. 7 is a schematic showing a manufacturing procedure for a solid oxide fuel cell according to an embodiment of the invention.

First, as shown in FIG. 7, inside cylindrical member 64, intermediate cylindrical member 65, external cylindrical member 66, and first affixing member 63 are assembled by welding (step S1 in FIG. 24). Here first affixing member 63 is disposed so as to be perpendicular to the center axis line of inside cylindrical member 64, and the outer circumferential edge thereof is welded in an airtight manner to the inside wall surface of inside cylindrical member 64. In addition, reforming catalyst 96 is filled into the reforming section 94 provided between inside cylindrical member 64 and intermediate cylindrical member 65. Furthermore, water supply pipe 88 and fuel gas supply pipe 90 are also attached by welding.

Figure 8:
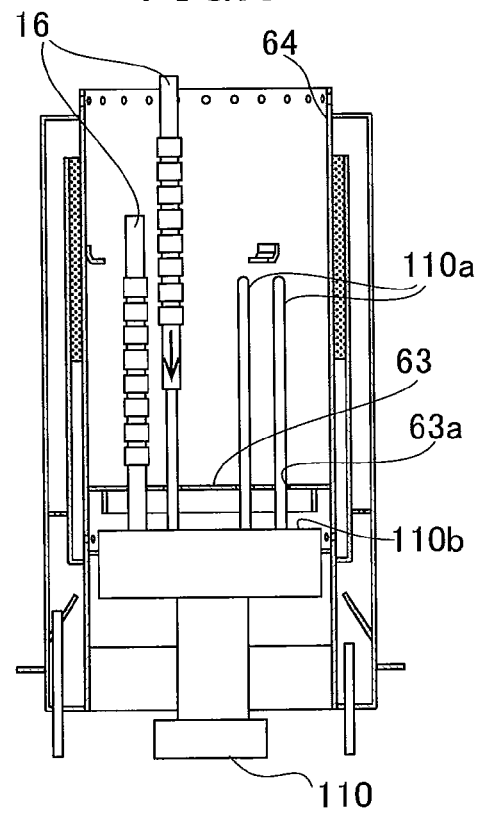
FIG. 8 is a schematic showing a manufacturing procedure for a solid oxide fuel cell according to an embodiment of the invention.

Next, as shown in FIG. 8, lower fixture 110, which is a first positioning device, is accurately positioned relative to inside cylindrical member 64 (step S2 in FIG. 24). Lower fixture 110 comprises multiple positioning shafts 110a extending upward, parallel to inside cylindrical member 64; these positioning shafts 110a are disposed to penetrate each of the insertion holes 63a formed in first affixing member 63 and extend. In addition, fuel cells 16 are respectively disposed on each of the positioning shafts 110a which penetrate insertion holes 63a and extend. In this step, each individual fuel cell 16 is inserted into each insertion hole 63a of first affixing member 63.

By the insertion of positioning shafts 110a into fuel cells 16, one end of fuel cells 16 is positioned relative to positioning shafts 110a. Since lower fixture 110 is positioned relative to inside cylindrical member 64, one end of individual fuel cell 16 is accurately positioned relative to inside cylindrical member 64, a constituent of fuel cell module 2. Moreover, because the bottom end of each fuel cell 16 contacts the base end surface 110b of positioning shafts 110a, the bottom ends of all fuel cells 16 are positioned in the same plane. That is, the projection length of each individual fuel cell 16 from first affixing member 63 is fixed. On the other hand, because there is variability in the lengths of fuel cells 16 due to manufacturing tolerances, the heights of the top ends of the fuel cells 16 are not perfectly uniform.

Therefore in this step, the one end of each fuel cell 16 inserted into each of the insertion holes 63a is positioned relative to the inside cylindrical member 64 that makes up fuel cell module 2.

Figure 9:
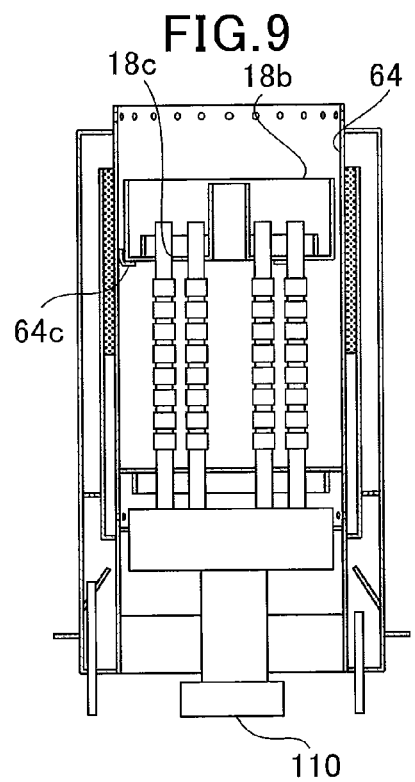
FIG. 9 is a schematic showing a manufacturing procedure for a solid oxide fuel cell according to an embodiment of the invention.

Next, as shown in FIG. 9, collection chamber lower member 18b, which is a second affixing member and constituent of exhaust collection chamber 18, is positioned at the top end of individual fuel cell 16 (step S3 in FIG. 24). The three stays 64c, which are positioning members, are welded to the inside wall surface of inside cylindrical member 64. Each stay 64 comprises a parallel portion extending parallel to first affixing member 63, and is disposed at equal intervals on the inside wall surface of inside cylindrical member 64. When collection chamber lower member 18b is disposed on top of each stay 64c, collection chamber lower member 18b is dropped down to the parallel portion of each of the stays 64c and accurately positioned relative to inside cylindrical member 64, which makes up the inside wall surface of generating chamber 10. In this state, a uniform gap is formed between the inside circumferential surface of inside cylindrical member 64 and the outside circumferential surface of collection chamber lower member 18b. In this state, the top ends of fuel cells 16 are inserted to each of the insertion holes 18c in collection chamber lower member 18b, which constitutes the second affixing member.

Figure 10:
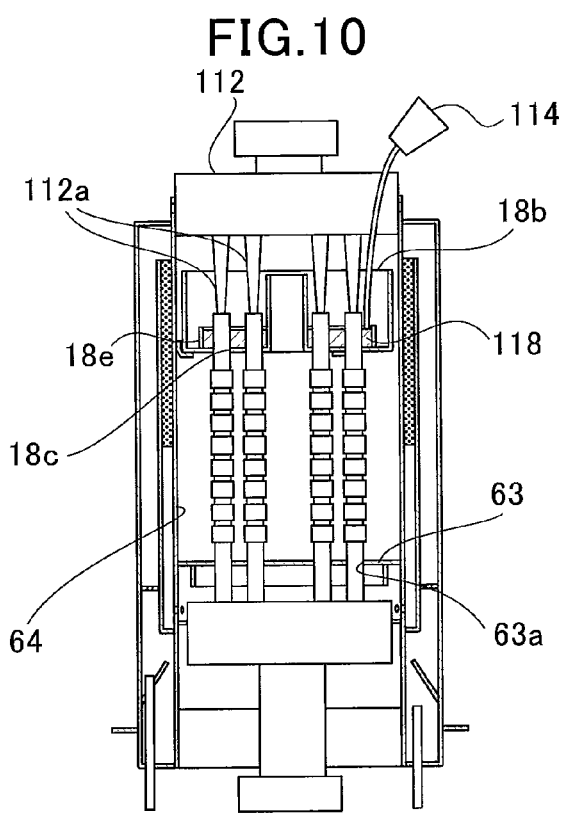
FIG. 10 is a schematic showing a manufacturing procedure for a solid oxide fuel cell according to an embodiment of the invention.

In addition, as shown in FIG. 10, a upper fixture 112, being a second positioning apparatus, is disposed at the top portion of inside cylindrical member 64 (FIG. 24, step S4). Upper fixture 112 comprises multiple truncated cones 112a extending downward, parallel to inside cylindrical member 64. The tips of truncated cones 112a are inserted into downward extending fuel cells 16, and the side surface of each of the truncated cones 112a contacts the top and portion of fuel cells 16. Since upper fixture 112 is correctly positioned relative to inside cylindrical member 64, the top ends of each of the fuel cells 16 are also correctly positioned relative to inside cylindrical member 64.

Therefore in this step, the other end of the fuel cells 16 inserted into insertion holes 18c of collection chamber lower member 18b is registered by upper fixture 112 relative to the inside cylindrical member 64, which constitutes fuel cell module 2.

Thus the top end and bottom portion of each of the fuel cells 16 are accurately positioned relative to inside cylindrical member 64. In this state, an essentially fixed gap is formed between the outer circumferential surface of each individual fuel cell 16 and the insertion holes 18c in collection chamber lower member 18b, as well as the insertion holes 63a in first affixing member 63. That is, each individual fuel cell 16 is positioned at a predetermined position relative to fuel cell module 2 (inside cylindrical member 64), in a state whereby each insertion hole 18c in collection chamber lower member 18b is separated by a predetermined distance from the edge portion of insertion hole 63a on first affixing member 63. A small curve is present in the fuel cells 16 due to manufacturing tolerances, however since fuel cells 16 are correctly positioned relative to fuel cell module 2 at the top and bottom ends, the gap between the outer circumferential surface of fuel cells 16 and each of the insertion holes can be made essentially uniform.

Thus in a state whereby each of the fuel cells 16 is positioned, an adhesive applying step is implemented in which ceramic adhesive is injected onto collection chamber lower member 18b by an adhesive injection apparatus 114, being an adhesive application apparatus. An adhesive filling frame 18e extending in a ring shape to surround all of insertion holes 18c is disposed on collection chamber lower member 18b (FIG. 4). Adhesive injection apparatus 114 fills the inside of adhesive filling frame 18e which surrounds insertion holes 18c with adhesive and applies ceramic adhesive to the joint portion. The region surrounded by adhesive filling frame 18e on collection chamber lower member 18b functions as an adhesive receiving section. Ceramic adhesive is a viscous liquid which slides on collection chamber lower member 18b when injected, and its viscosity is adjusted to the level that an essentially uniform thickness of ceramic adhesive layer 118 can be formed on the inside of adhesive filling frame 18e. Injected ceramic adhesive does fill gaps, eve running into the gap between the outer circumferential surface of each of the fuel cells 16 and the insertion holes 18c, but is given a viscosity such that it will not run downward from these gaps.

Figure 11:
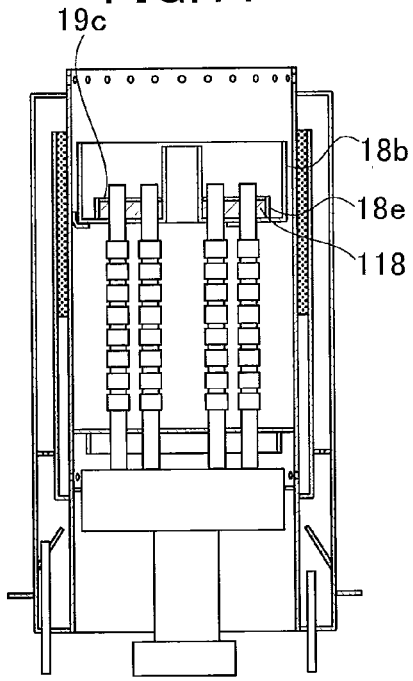
FIG. 11 is a schematic showing a manufacturing procedure for a solid oxide fuel cell according to an embodiment of the invention.

As shown in FIG. 11, a predetermined amount of ceramic adhesive is injected, and after ceramic adhesive layer 118 spreads out uniformly on the inside of adhesive filling frame 18e on top of collection chamber lower member 18b, the upper fixture 112 is removed. In this state, cover member 19c is disposed on top of injected ceramic adhesive layer 118 (FIG. 24, step S5).

Figure 12:
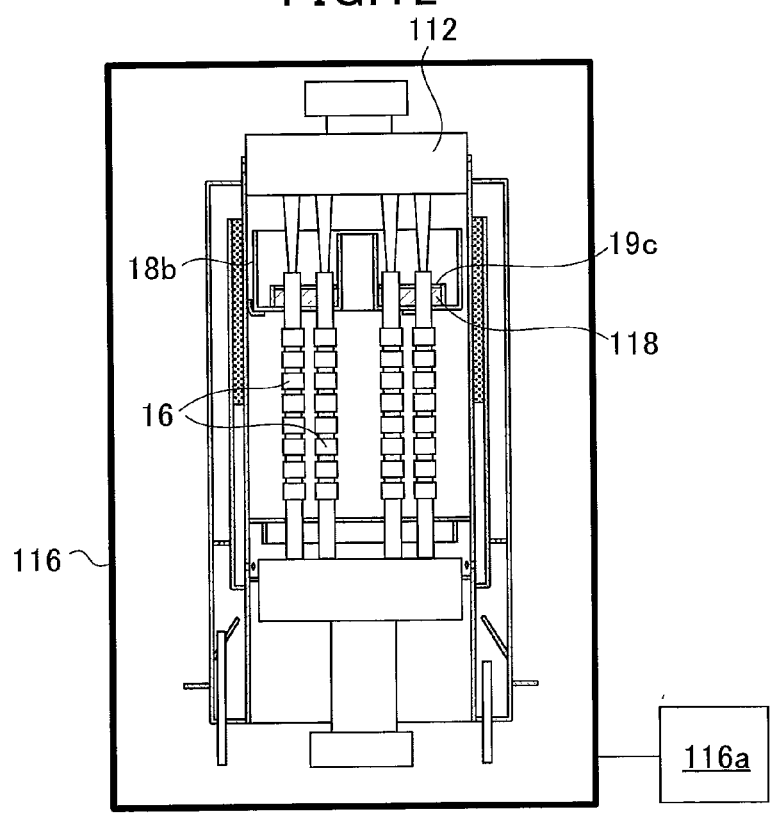
FIG. 12 is a schematic showing a manufacturing procedure for a solid oxide fuel cell according to an embodiment of the invention.

As shown in FIG. 12, after cover member 19c is placed, upper fixture 112 is once again attached, and the apparatus placed in this state into drying oven 116; ceramic adhesive layer 118 is hardened and the outer circumferential surface of each individual fuel cell 16 is affixed to collection chamber lower member 18b (FIG. 24, step S6). Therefore drying oven 116 functions as an adhesive hardening apparatus. Thus the cell joining portion between fuel cells 16, which are constituent members of the flow path which guides fuel, and collection chamber lower member 18b, is joined in an airtight manner by ceramic adhesive layer 118.

Next we explain the dry hardening step for dry hardening ceramic adhesive. The dry hardening step has a workable hardening step for hardening the ceramic adhesive to a state in which the next manufacturing process can be executed, and a solvent elimination step for hardening the ceramic adhesive to a state in which it can withstand the temperature rise in startup procedure of solid oxide fuel cell apparatus 1. Below we explain the workable hardening step.

In the embodiment, ceramic adhesives containing aluminum oxide, quartz, alkali metal silicates, silicon dioxide, and water are used as ceramic adhesive in the embodiment, and these ceramic adhesives are hardened by a dehydration condensation reaction. That is, ceramic adhesives are hardened by the evaporation of included water, and of moisture produced by the condensation reaction. Therefore an extremely long time period is required to dry and harden ceramic adhesives at room temperature, so it is common in industry to harden using a drying oven or the like. However, because moisture is evaporated and volume shrinks when ceramic adhesive is hardened, cracks form in the ceramic adhesive layer with normal drying and hardening.

Figure 27:
FIG. 27 is a photograph showing an example of adhesion of an individual fuel cell using ceramic adhesive in a normal adhesion method.

FIG. 27 is a photograph showing an example of when an individual fuel cell is adhered by the normal adhesion method using ceramic adhesive. As shown in FIG. 27, a large number of cracks has occurred in the hardened ceramic adhesive layer. Cracks are thought to occur on the surface of the earlier hardening adhesive layer at the time of hardening, when moisture in the surface of the adhesive layer evaporates earlier and the adhesive hardens, so that internal moisture evaporates later. Even in such a state, the fuel cells are adhered with sufficient strength, but partial gaps form between the fuel cells and the ceramic adhesive so that sufficient airtightness cannot be secured. That is, when ceramic adhesive is used with conventional methods, it is difficult to obtain adhesion and airtightness simultaneously, and this is believed to be the reason that they have still not reached a practical stage, notwithstanding multiple literature references proposing the use of ceramic adhesives in the technical field of solid oxide fuel cells.

Figure 22:
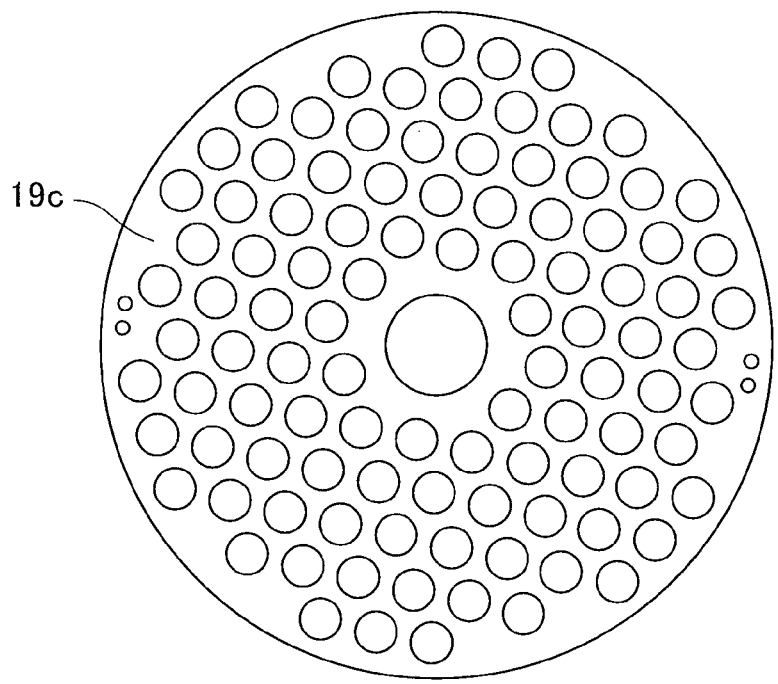
FIG. 22 is a plan view of a cover member disposed on injected ceramic adhesive in a solid oxide fuel cell according to an embodiment of the invention.

FIG. 22 is a plan view of cover member 19c disposed on injected ceramic adhesive in the embodiment.

Cover member 19c is a circular metal plate; a large circular opening for inserting the cylindrical portion of collection chamber lower member 18b is formed at the middle thereof, and multiple insertion holes for inserting each of the fuel cells 16 are formed in the periphery thereof. In the embodiment, the position and size of the insertion holes is constituted to be the same as that of insertion holes 18c in collection chamber lower member 18b.

Figure 23:
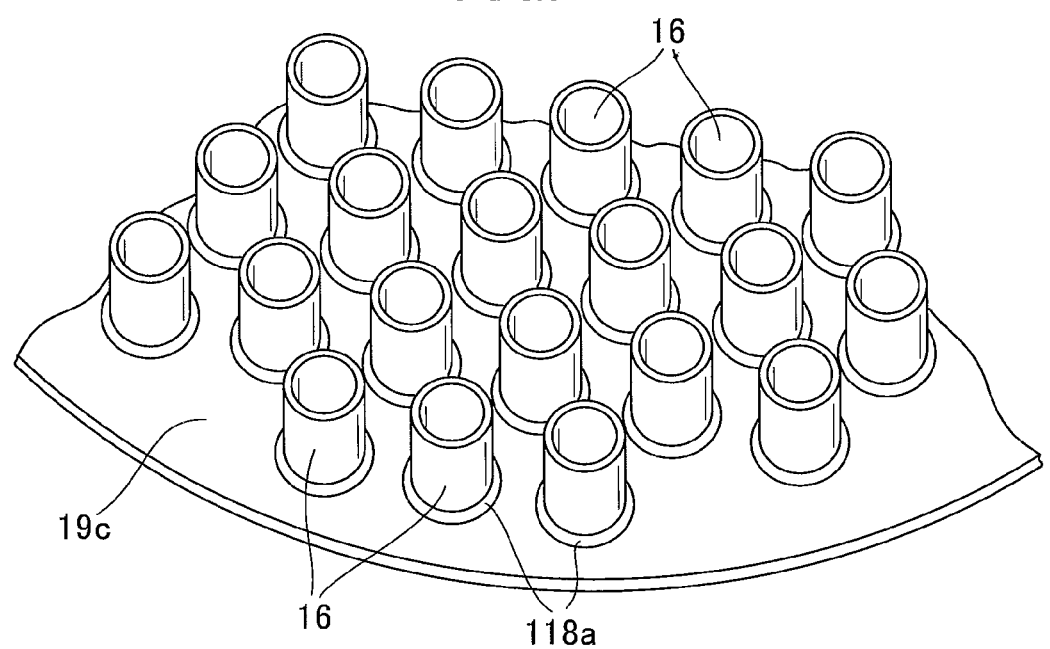
FIG. 23 is a perspective view of a cover member disposed on injected ceramic adhesive in a solid oxide fuel cell according to an embodiment of the invention.

FIG. 23 is a perspective view showing cover member 19c disposed on the injected ceramic adhesive.

As shown in FIG. 23, when cover member 19c is disposed on be injected ceramic adhesive, ceramic adhesive underneath cover member 19c is pushed out by the weight of cover member 19c. The pushed out ceramic adhesive is filled into the gap between the insertion holes in cover member 19c and the outer circumferential surface of fuel cells 16, and protrudes on the perimeter of the fuel cells 16. As an variant example, a perimeter wall can be formed to surround the insertion holes on the edges of each insertion hole in cover member 19c. Thus even if a large amount of ceramic adhesive is pushed out around each of the fuel cells 16, the flow of adhesive onto cover member 19c can be suppressed.

Note that each of fuel cells 16 is adhered with ceramic adhesive to the lead film layer 104a, 104b parts thereof (FIGS. 6(a) and 6(b)). Lead film layers 104a, 104b are dense layers, the same as solid electrolyte layer 100, therefore ceramic adhesive does not invade porous layers in porous support body 97 or the like, and airtightness is not compromised.

Figure 25:
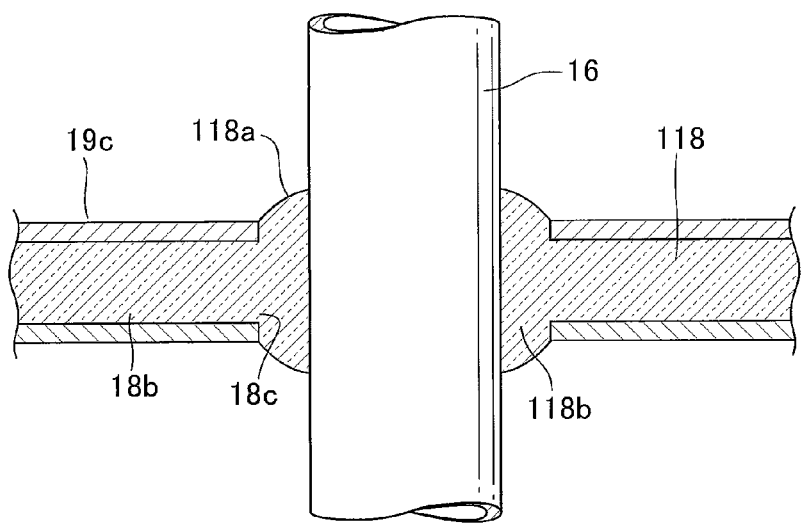
FIG. 25 is a cross-section showing an expanded view of the adhering portion to a bottom piece of a fuel cell collecting chamber.

FIG. 25 is a cross section showing an expanded view of the adhering portion of fuel cells 16 to collection chamber lower member 18b.

As shown in FIG. 25, fuel cells 16 are inserted into the insertion holes 18c in collection chamber lower member 18b, and ceramic adhesive is injected onto collection chamber lower member 18b. Cover member 19c is disposed on the injected ceramic adhesive. Insertion holes are also formed in cover member 19c at the same positions as collection chamber lower member 18b, and fuel cells 16 penetrate these insertion holes and extend. Since a predetermined gap is present between the insertion holes in cover member 19c and the outer circumferential surface of fuel cells 16, cover member 19c is mounted on top of the ceramic adhesive so that the surface region of the joined fuel cells 16 is exposed. Thus ceramic adhesive layer 118 is formed between collection chamber lower member 18b and cover member 19c. A part of the ceramic adhesive is pressed out from beneath cover member 19c in the surface vicinity of fuel cells 16; the amount of ceramic adhesive in this vicinity increases and a prominence 118a is formed on the periphery of fuel cells 16. Also, pressed out ceramic adhesive forms a hanging portion 118b between insertion holes 18c and fuel cells 16, but due to viscosity, the ceramic adhesive does not flow downward. The assembly on which cover member 19c is disposed is placed in this state into drying oven 116 (FIG. 12).

Figure 26:
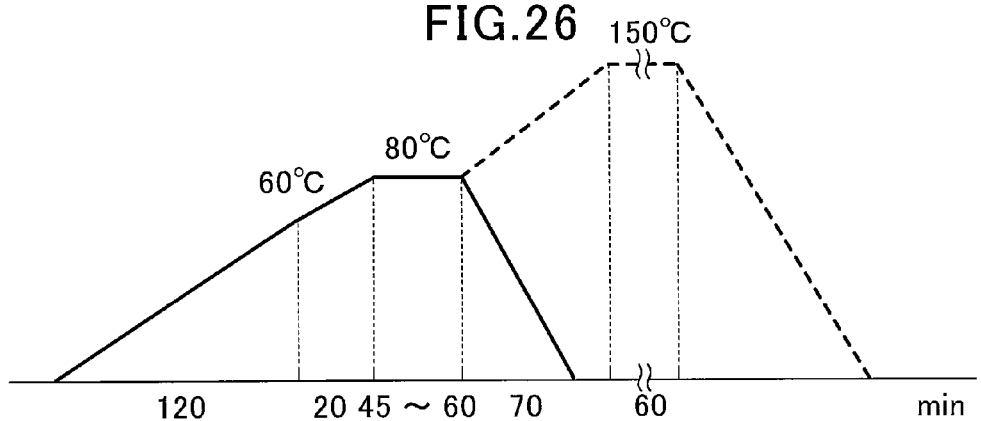
FIG. 26 is a graph illustrating an example of temperature control within a drying oven in a workable hardening step and a solvent elimination and hardening step in a solid oxide fuel cell according to an embodiment of the invention.

FIG. 26 is a graph of an example of the temperature control inside drying oven 116.

In the workable hardening step shown in FIG. 12, the control shown by the solid line in FIG. 26 is imposed by heating controller 116a. First, after placing the assembly in drying oven 116, the temperature inside the drying oven 116 is raised from room temperature to approximately 60° C. in approximately 120 minutes. Next, the temperature in drying oven 116 is raised to approximately 80° C. in approximately 20 minutes, and thereafter maintained at approximately 80° C. for approximately 60 minutes. After maintain the temperature at approximately 80° C., the temperature in the drying oven 116 is returned to room temperature in approximately 30 minutes.

Thus by gradually raising the temperature, moisture in the ceramic adhesive layer 118 vaporizes slowly. However, because ceramic adhesive layer 118 is covered by cover member 19c, moisture does not directly vaporize from the part covered by cover member 19c. Therefore moisture in ceramic adhesive layer 118 is vaporized slowly through prominence 118a or hanging portion 118b on the periphery of fuel cells 16. Because of this concentration of moisture in prominence 118a and hanging portion 118b, which are exposed to outside air, it is difficult for these parts to dry. Since cover member 19c and collection chamber lower member 18b are made of metal with a high coefficient of thermal conductivity, heating of ceramic adhesive layer 118 is averaged even in cases where there is localized heating due to temperature unevenness, etc. within drying oven 116. This enables the suppression of cracks caused by sudden localized drying of the ceramic adhesive layer 118. On the other hand, because each of the fuel cells 16 is made of ceramic with a low coefficient of thermal conductivity, it is difficult for heat to transfer to the prominence 118a and hanging portion 118b around the fuel cells 16, and the drying and hardening of these parts is thus more gradual than other parts.

Thus in the embodiment, because drying of the prominence 118a and hanging portion 118b on each of the fuel cells 16 is gradual, what is important for securing airtightness is to prevent cracking in the periphery of each of the fuel cells 16. Vaporization of moisture from the ceramic adhesive also results in reduction in the volume of the ceramic adhesive layer 118, producing "shrinkage." However in the peripheral part of each of the fuel cells 16, because of the formation of prominence 118a and hanging portion 118b, the ceramic adhesive layer is thicker than in other parts, therefore gaps between fuel cells 16 and the ceramic adhesive layer caused by the occurrence of shrinkage can be prevented. Thus airtightness can be secured in the adhered portion between each of the fuel cells 16 and each of the insertion holes 18c. Cover member 19c, which is disposed to cover the parts filled with ceramic adhesive, suppresses the occurrence of cracks when the ceramic adhesive hardens.

Because of the formation of prominence 118a and hanging portion 118b, there is little through-puncturing of the ceramic adhesive by cracks even if a few cracks do occur in these parts, so airtightness can be reliably secured. Therefore prominence 118a and hanging portion 118b function as gas leak prevention portions for suppressing the occurrence of cracks caused by shrinkage when the ceramic adhesive hardens. Note that hardened ceramic adhesive is porous, and although airtightness relative to hydrogen or air is not total, a ceramic adhesive filled and hardened without gaps provides sufficient airtightness for practical use. In this Specification, the term "securing airtightness" means there are no leaks of moisture or air at a practical level.

In the workable hardening step shown in FIG. 12, the ceramic adhesive is hardened to a state in which the manufacturing processes subsequent to step S7 in FIG. 7 can be practiced. In this state, adhesion strength from the ceramic adhesive is sufficiently high, and in the use of common ceramic adhesives, this state can be viewed as the completion of the adhesion step. However, when ceramic adhesive is use in the assembly of solid oxide fuel cell apparatus 1, this state is insufficient, and if solid oxide fuel cell apparatus 1 is operated in this state, residual moisture inside solid oxide fuel cell apparatus 1 will suddenly vaporize, causing large cracks in the ceramic adhesive. In this embodiment, for this state, the manufacturing processes in FIG. 13 and below are implemented.

Figure 13:
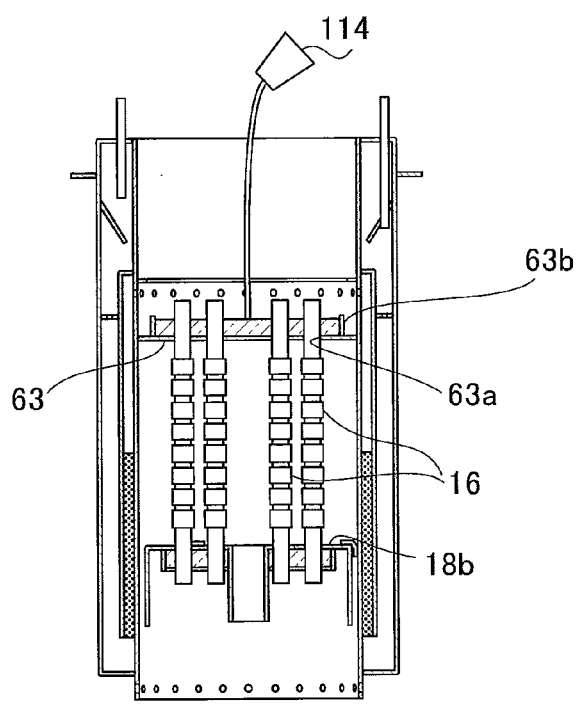
FIG. 13 is a schematic showing a manufacturing procedure for a solid oxide fuel cell according to an embodiment of the invention.

Next, after performing the workable hardening step, lower fixture 110 and upper fixture 112 are removed. Furthermore, as shown in FIG. 13, the top and bottom of the assembly are inverted, and ceramic adhesive is injected into the top of first affixing member 63 (the bottom surface when top and bottom are uninverted), from which the tip portions of each of the fuel cells 16 are protruding (FIG. 24, step S7). The outer circumferential surfaces of each of the fuel cells 16 with circular cross sections are affixed by ceramic adhesive to the edge portions of each of the round insertion holes 63a disposed on first affixing member 63. Here, adhesive filling frame 63b, extending in a circular shape to surround all of the insertion holes 63a, is disposed on first affixing member 63 (FIG. 3). For the adhesive application step, ceramic adhesive is injected by adhesive injection apparatus 114 into the interior of adhesive filling frame 63b, which surrounds each of the insertion holes 63a. Note that adhesion of each of the fuel cells 16 to first affixing member 63 in this step is the same as the above-described adhesion to collection chamber lower member 18b. Also, in this step each of the fuel cells 16 is affixed to collection chamber lower member 18b, therefore each of the fuel cells 16 can be held in the appropriate position without using upper fixture 112.

Figure 14:
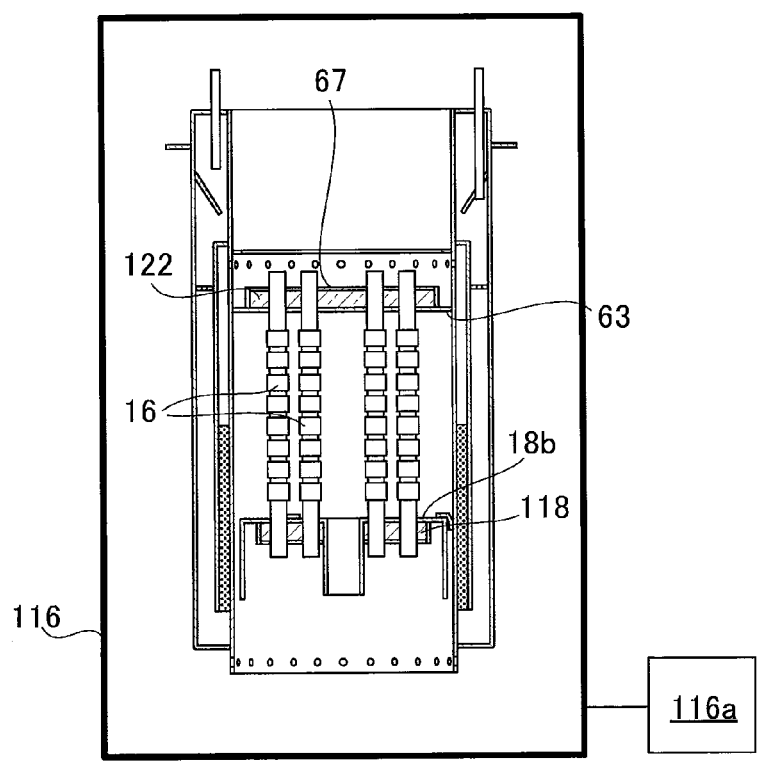
FIG. 14 is a schematic showing a manufacturing procedure for a solid oxide fuel cell according to an embodiment of the invention.

Furthermore, as shown in FIG. 14, cover member 67 is disposed on the injected ceramic adhesive, and a ceramic adhesive layer 122 is formed between first affixing member 63 and cover member 67 (FIG. 24, step S8). Except for the formation of a circular opening at the center, cover member 67 is constituted in the same way as cover member 19c (FIG. 22), suppressing cracking during ceramic adhesive hardening. By placement of this cover member 67, a prominence and a hanging portion similar to FIG. 25 are formed on the periphery of each of the fuel cells 16, and the peripheral part of ceramic adhesive layer 122 on each of the fuel cells 16 serves to suppress gas leakage.

In this state, assembly is placed in drying oven 116, and the second workable hardening step is implemented. In this workable hardening step, as well, the temperature inside drying oven 116 is controlled as shown by the solid line in FIG. 26. Note that in the embodiment, in the second workable hardening step the time during which the temperature inside drying oven 116 is maintained at 80° C. is set to approximately 50 minutes. In the second workable hardening step, ceramic adhesive layer 122 on first affixing member 63 is hardened, and each of the fuel cells 16 is affixed to first affixing member 63. Thus the cell joining portion between fuel cells 16, which are constituent members of the flow path which guides fuel, and first affixing member 63, is joined in an airtight manner by ceramic adhesive layer 118. The operation of cover member 67 on this occasion is the same as in the first workable hardening step. Ceramic adhesive layer 118 is placed in a more stable state by the implementation of the second workable hardening step to ceramic adhesive layer 118 on collection chamber lower member 18b.

Figure 15:
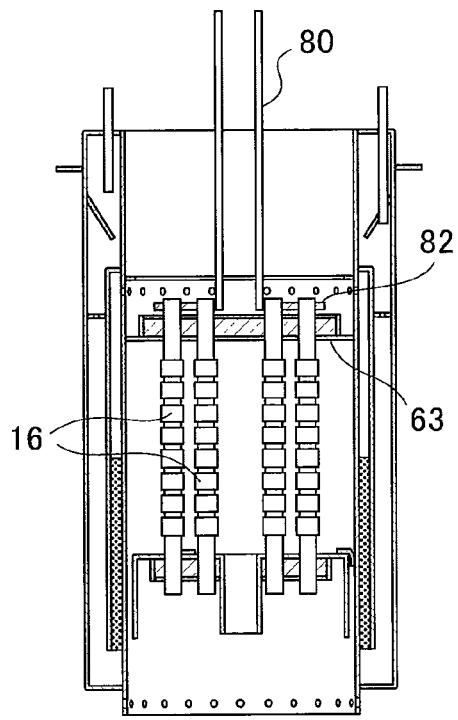
FIG. 15 is a schematic showing a manufacturing procedure for a solid oxide fuel cell according to an embodiment of the invention.

Next, as shown in FIG. 15, power collector 82 is attached to the tip portions (the bottom portion when top and bottom are inverted) of each of the fuel cells 16 protruding from first affixing member 63, and this power collector 82 is connected to bus bars 80 (FIG. 24, step S9).

Figure 16:
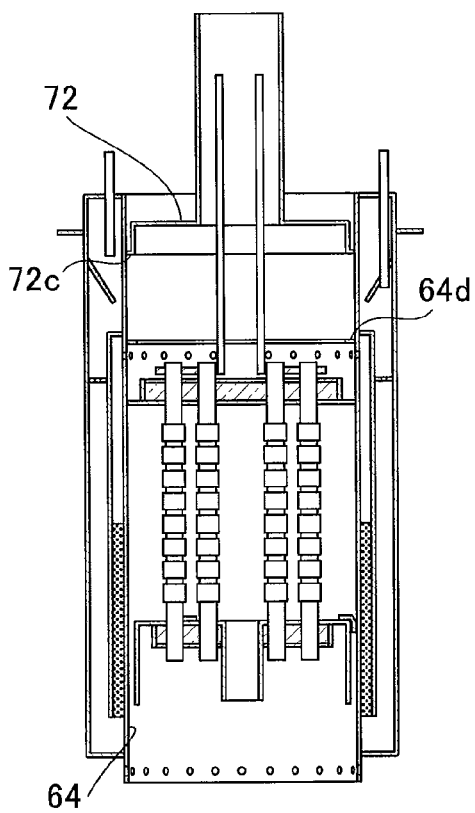
FIG. 16 is a schematic showing a manufacturing procedure for a solid oxide fuel cell according to an embodiment of the invention.

Furthermore, as shown in FIG. 16, dispersion chamber bottom member 72 is inserted from the opening at the bottom of inside cylindrical member 64 at the bottom of FIG. 16). This dispersion chamber bottom member 72 is inserted up to the position at which the flange portion 72c on the outer circumference thereof makes contact with the ring shaped shelf member 64d welded onto the inside wall surface of inside cylindrical member 64, and will be registered at that position (FIG. 24, step S10).

Figure 17:
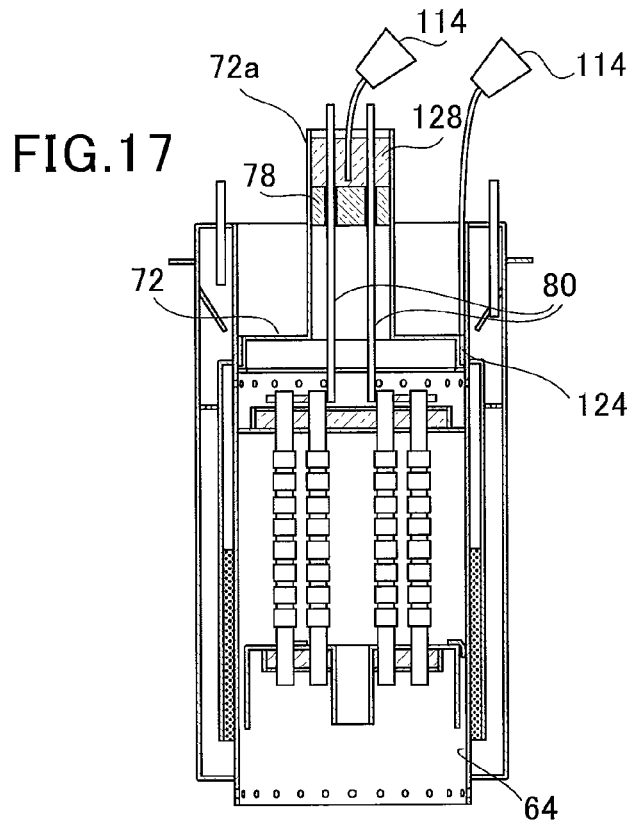
FIG. 17 is a schematic showing a manufacturing procedure for a solid oxide fuel cell according to an embodiment of the invention.

Next, as shown in FIG. 17, ceramic adhesive is filled by adhesive injection apparatus 114 into the circular gap between the outer circumferential surface of dispersion chamber bottom member 72 and the inner circumferential surface of inside cylindrical member 64. Also, insulator 78 is disposed in the middle of the insertion pipe 72a provided at the center of dispersion chamber bottom member 72, and each of the bus bars 80 extending from power collector 82 penetrate this insulator 78. In addition, as an adhesive application step, ceramic adhesive is filled by adhesive injection apparatus 114 into the insertion pipe 72a on which insulator 78 is disposed. Each of the bus bars 80 extends through insertion pipe 72a to the outside, and ceramic adhesive is filled into the space surrounding each of the bus bars 80 inside insertion pipe 72a (FIG. 24, step S11).

Figure 18:
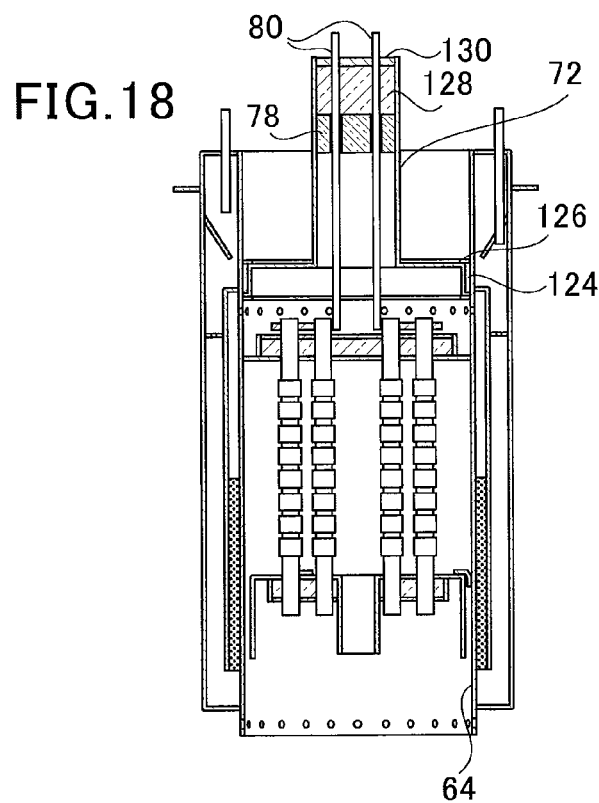
FIG. 18 is a schematic showing a manufacturing procedure for a solid oxide fuel cell according to an embodiment of the invention.

In addition, a dispersion chamber seal 126, being a circular thin plate on the ceramic adhesive layer 124 filled into the circular gap between the outer circumferential surface of dispersion chamber bottom member 72 and the inner circumferential surface of inside cylindrical member 64, is disposed as shown in FIG. 18. Also, a center seal plate 130 is disposed on the ceramic adhesive layer 128 filled into the interior of insertion pipe 72a (FIG. 24, step S12). A center seal plate 130 penetrates the holes formed on each bus bar 80. These dispersion chamber seals 126 and center seal plates 130 function as cover members for controlling the occurrence of cracks when the ceramic adhesive is hardening. In the state, the assembly is placed into drying oven 116 (not shown in FIG. 18), and a third workable hardening step is implemented (FIG. 24, step S13). In this workable hardening step, as well, the temperature inside drying oven 116 is controlled as shown by the solid line in FIG. 26. Note that in the embodiment, in the third workable hardening step the time during which the temperature inside drying oven 116 is maintained at 80° C. is set to approximately 45 minutes. In the second workable hardening step, ceramic adhesive layer 124 is hardened, and dispersion chamber bottom member 72 and inside cylindrical member 64 are adhered and affixed. Thus the joint portion between dispersion chamber bottom member 72, which is a constituent part of the flow path guiding fuel, and inside cylindrical member 64, is joined in an airtight manner by ceramic adhesive. In addition, ceramic adhesive layer 128 is also hardened, and insertion pipe 72a through which each of the bus bars 80 penetrate is closed off in an airtight manner.

When these ceramic adhesives are dried, dispersion chamber seal 126 and center seal plate 130 prevent the sudden drying out of the surfaces of each of the adhesive layers, thereby suppressing the occurrence of cracks in ceramic adhesive layers 124 and 128. Also, ceramic adhesive layer 124, which is filled into the gap between inside cylindrical member 64 and dispersion chamber bottom member 72, is heated and hardened uniformly because of its circular shape, and the occurrence of cracking is thereby suppressed. For example, if the ceramic adhesive layer is formed in a rectangular shape, the speed of hardening differs between the corner portions and other parts, therefore the parts which dry and harden first are stretched by shrinkage of the ceramic adhesive and therefore tend to crack more easily. Stress is also more easily concentrated at the corner portions due to shrinkage of the ceramic adhesive such that cracks can easily occur. By contrast, because ceramic adhesive layer 124 in the embodiment is circular in shape, stress caused by shrinkage of the adhesive is not concentrated as drying and hardening proceed, therefore the occurrence of cracking associated with hardening of the ceramic adhesive can be suppressed. As a variant example, ceramic adhesive layer 124 can be constituted in an oval shape.

Figure 19:
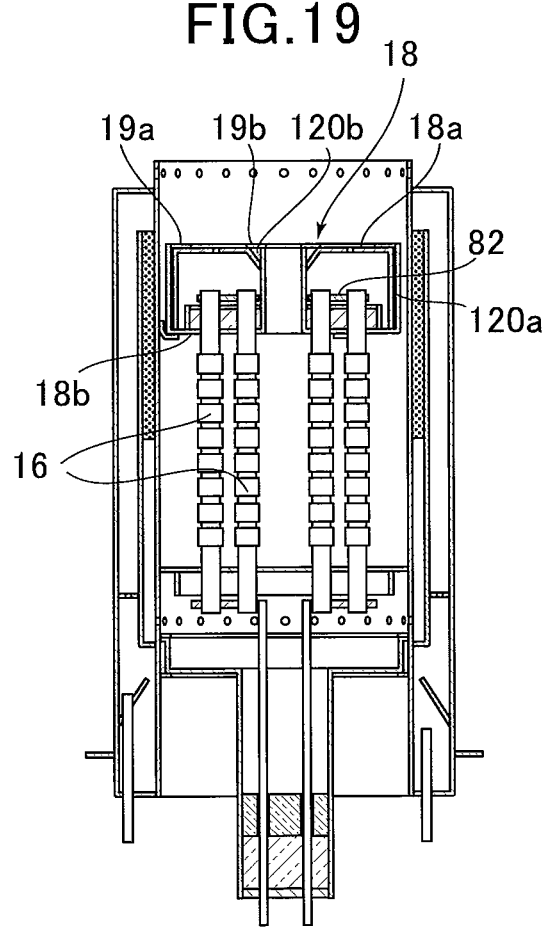
FIG. 19 is a schematic showing a manufacturing procedure for a solid oxide fuel cell according to an embodiment of the invention.

After completion of the third workable hardening step, the top and bottom of the assembly are inverted, and as shown in FIG. 19, power collector 82 is attached to the tip portion of each of the fuel cells 16, which are affixed in such a way as to protrude from collection chamber lower member 18b (FIG. 24, step S14). The tip portions of each of the fuel cells 16 are thus electrically connected by this power collector 82. Furthermore, collection chamber upper member 18a is disposed on the opening portion at the top of collection chamber lower member 18b. There is a (circular) gap (FIG. 4) between the outer circumferential surface of the disposed collection chamber upper member 18a and the inner circumferential surface of the outer perimeter wall of collection chamber lower member 18b. Next, an adhesive application step is implemented to fill this gap with ceramic adhesive layer 120a using adhesive injection apparatus 114 (not shown in FIG. 19). A circular large diameter seal 19a is disposed so as to cover the filled-in adhesive on top of ceramic adhesive layer 120a. There is also a circular gap between the outer circumferential surface of collection chamber lower member 18b and the opening portion at the center of collection chamber upper member 18a, and this gap is also filled with ceramic adhesive layer 120b using adhesive injection apparatus 114 (not shown in FIG. 19). A circular small diameter seal 19b is disposed to cover the filled-in adhesive on top of ceramic adhesive layer 120b. This large diameter seal 19a and small diameter seal 19b function as cover members for controlling the occurrence of cracks when the ceramic adhesive is hardening.

Note that as a variant example, the invention can be constituted in such a way that the members are formed so the gap between collection chamber upper member 18a and collection chamber lower member 18b is oval in shape, and exhaust collection chamber 18 is formed by filling this gap with ceramic adhesive. Note that as a variant example, the invention can be constituted in such a way that the members are formed so the gap between the cylindrical portion of collection chamber lower member 18b and the opening portion of collection chamber upper member 18a is oval in shape, and exhaust collection chamber 18 is formed by filling this gap with ceramic adhesive.

In the state, the assembly is again placed into drying oven 116 (not shown in FIG. 19), and a third workable hardening step is implemented (FIG. 24, step S15). In this workable hardening step, as well, the temperature inside drying oven 116 is controlled as shown by the solid line in FIG. 26. Note that in the embodiment, in the fourth workable hardening step the time during which the temperature inside drying oven 116 is maintained at 80° C. is set to approximately 45 minutes. Ceramic adhesive layer 120a in the perimeter portion of exhaust collection chamber 18 and ceramic adhesive layer 120b in the center portion of exhaust collection chamber 18 are hardened by the fourth workable hardening step. At this time, large diameter seal 19a disposed on ceramic adhesive layer 120a and small diameter seal 19b disposed on ceramic adhesive layer 120b prevent sudden vaporization of moisture in each of the ceramic adhesive surfaces in the workable hardening step. The occurrence of cracks in ceramic adhesive layers 120a and 120b can thus be suppressed, and the airtightness of joint portions secured. Thus the joining portion between collection chamber upper member 18a, which is a constituent part of the flow path which guides fuel, and collection chamber lower member 18b, is joined in an airtight manner by ceramic adhesive. Note that each of the ceramic adhesive layers, hardened by what is now three iterations of the workable hardening step, is again gradually heated in a fourth workable hardening step, so remaining moisture is vaporized while avoiding the risk of cracking, and a more stable state is obtained.

Figure 20:
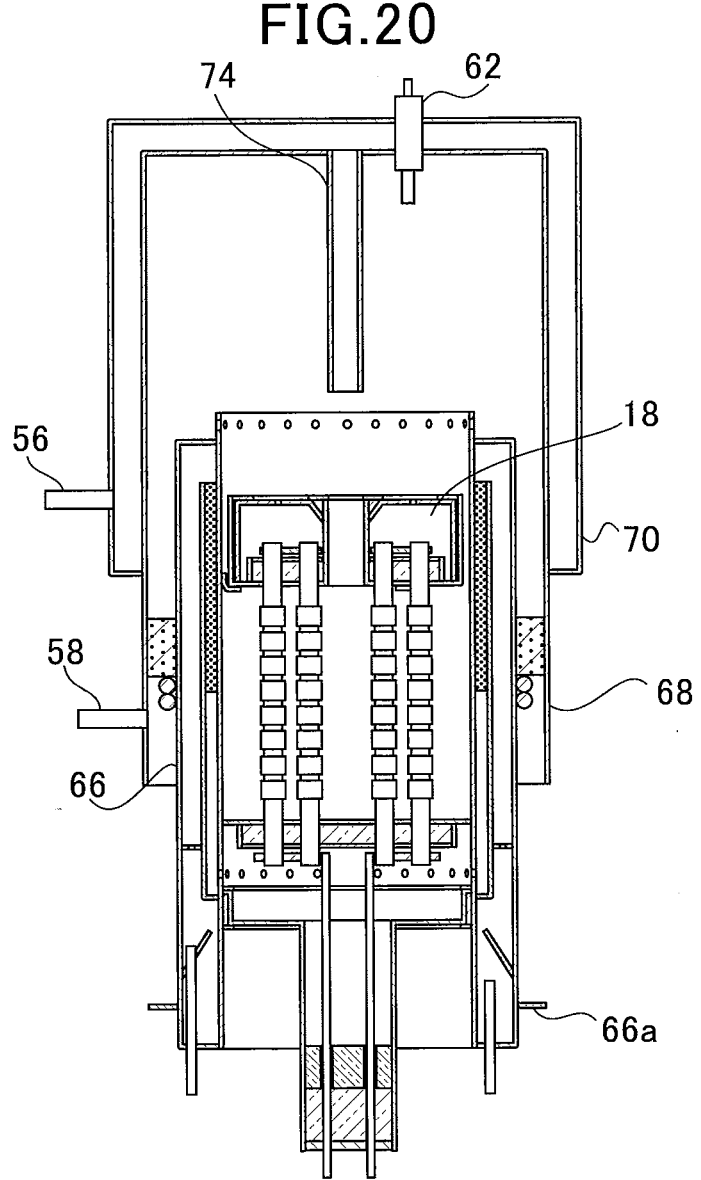
FIG. 20 is a schematic showing a manufacturing procedure for a solid oxide fuel cell according to an embodiment of the invention.

Next, as shown in FIG. 20, inside cylindrical container 68 and external cylindrical container 70, which is a supply path constituent part, are placed onto the top of the assembly assembled up to the state shown in FIG. 19 (FIG. 24, step S16). Inside cylindrical container 68 and external cylindrical container 70 are attached to the assembly in a state whereby they are joined by welding. Also, exhaust gas exhaust pipe 58 is attached to the outside wall surface lower portion of inside cylindrical container 68, and oxidant gas jetting pipe 74 is attached to the inside ceiling thereof. Oxidant gas introducing pipe 56 is attached to the outside wall surface lower portion of external cylindrical container 70. Also, ignition heater 62 is attached so as to penetrate inside cylindrical container 68 and external cylindrical container 70. By placing inside cylindrical container 68 over the assembly, an exhaust gas discharge flow path 21 (FIG. 2) is formed between the outer circumferential surface of external cylindrical member 66 and the inner circumferential surface of inside cylindrical container 68. Also, oxidant gas jetting pipe 74 attached to inside cylindrical container 68 penetrates the opening portion at the center of the exhaust collection chamber 18 on the assembly.

Note that as a variant example, the invention can be constituted so that inside cylindrical container 68 and external cylindrical container 70 are adhered using ceramic adhesive. In this case, ceramic adhesive is filled into the circular gap between inside cylindrical container 68 and external cylindrical container 70, affixing these members in an airtight manner. Alternatively, the invention can be constituted in such a way that these members are configured so the gap between the inside cylindrical container and the outside cylindrical container has an oval shape, and ceramic adhesive is filled into this oval shaped gap to affix these members in an airtight manner.

Figure 21:
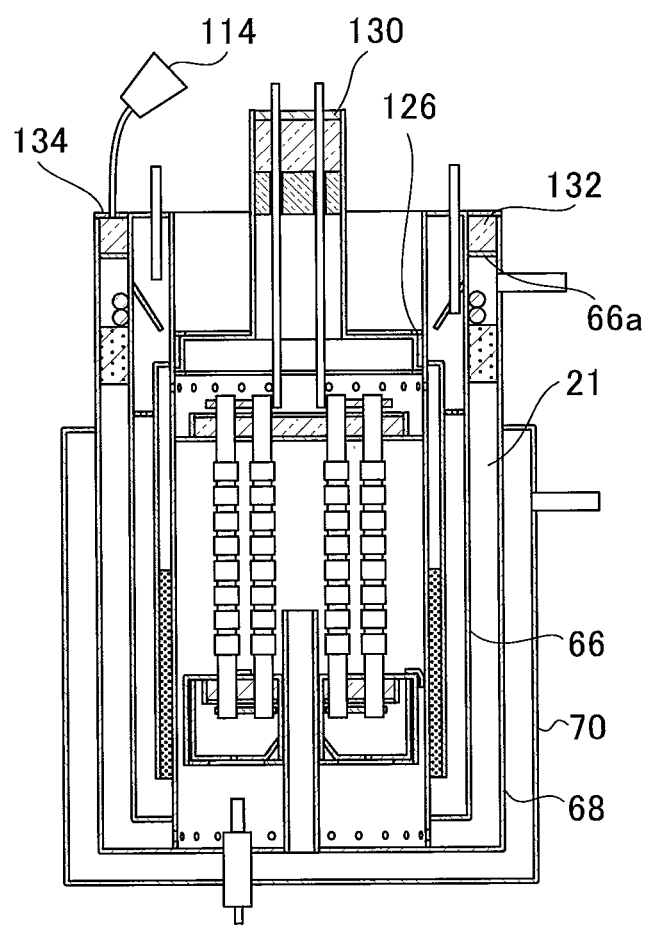
FIG. 21 is a schematic showing a manufacturing procedure for a solid oxide fuel cell according to an embodiment of the invention.

As shown in FIG. 21, the top and bottom of the assembly onto which inside cylindrical container 68 and external cylindrical container 70 are placed are again inverted. Here, circular shelf member 66a is welded to the outside wall surface lower portion of external cylindrical member 66 (the top portion in FIG. 21); this shelf member 66a closes the gap between the outer circumferential surface of external cylindrical member 66 and the inner circumferential surface of inside cylindrical container 68. This circular space, surrounded by the outer circumferential surface of external cylindrical member 66, the inner circumferential surface of inside cylindrical container 68, and shelf member 66a, is filled with ceramic adhesive by the adhesive injection apparatus 114 as an adhesive application step (FIG. 24, step S17). Note that as a variant example, an outside cylindrical member and inside cylindrical container may be constituted so the gap between the outside cylindrical member and inside cylindrical container filled with ceramic adhesive is oval in shape.

A circular exhaust passage seal 134 is disposed to cover filled-in ceramic adhesive layer 132. This exhaust passage seal 134 functions as a cover member for suppressing the occurrence of cracks when the ceramic adhesive hardens. In the state, the assembly is placed into drying oven 116 (not shown in FIG. 21), and a fifth workable hardening step is implemented (FIG. 24, step S18).

In this workable hardening step, as shown in FIG. 26, the temperature inside drying oven 116 is first raised from room temperature to approximately 60° C. in approximately 120 minutes by heating controller 116*a*, then raised to approximately 80° C. in approximately 20 minutes and maintained thereafter for approximately 60 minutes at approximately 80° C. After maintaining the temperature at approximately 80° C., the temperature inside drying oven 116 is raised to approximately 150° C. in approximately 70 minutes as shown by the dotted line in FIG. 26, as solvent elimination and hardening step. In addition, after the temperature is maintained at approximately 150° C. for approximately 60 minutes, it is then returned to room temperature in approximately 60 minutes.

That is, by implementing a fifth workable hardening step, the newly filled ceramic adhesive layer 132 is heated and hardened, and external cylindrical member 66 and inside cylindrical container 68 are adhered in an airtight manner. Thus the joint portion between external cylindrical member 66, which is a constituent part of the flow path guiding oxidant gas, and inside cylindrical container 68, is joined in an airtight manner by ceramic adhesive. At this time, the operation of exhaust passage seal 134 and the effect from the circular ceramic adhesive layer 132 are the same as for the above-described dispersion chamber seal 126 and ceramic adhesive layer 124. Also, the ceramic adhesive layers hardened in first through fourth workable hardening steps have respectively been subjected to multiple workable hardening steps, therefore gradual drying has been repeatedly applied, and a stable state of the ceramic adhesive layers is obtained while avoiding the risk of cracking.

In particular, the workable hardening steps applied to the cell joining portion between each of the fuel cells 16 and collection chamber lower member 18*b* is executed in the first of the five implemented workable hardening steps. Also, after the last implemented workable hardening step applied to the cell joining portion, that is, the workable hardening step applied to the joint portion between each of the fuel cells 16 and first affixing member 63 (the second workable hardening step), three iterations of workable hardening steps are implemented on constituent members other than the fuel cells 16. Therefore four or more workable hardening steps are implemented on each of the cell joint portions, and an extremely stable state is obtained for the ceramic adhesive layers in each of the cell joint portions. A major problem results if airtightness is compromised in the cell joint portions, but airtightness can be reliably secured by repeatedly applying these workable hardening steps.

The workable hardening steps applied between external cylindrical member 66 and inside cylindrical container 68 after the workable hardening steps applied to the cell joint portion have the purpose of securing airtightness in the exhaust gas discharge flow path 21 which conducts exhaust; even if by some chance airtightness is compromised here, the resulting negative effects would be less than when airtightness is compromised at the joint portion. In addition, as shown in the variant example described above, when inside cylindrical container 68 and external cylindrical container 70 are joined by ceramic adhesive, the workable hardening step applied to this joint portion is implemented after the workable hardening step applied to the cell joint portion. The joint portion between inside cylindrical container 68 and external cylindrical container 70 has the purpose of securing the airtightness of oxidant gas supply flow path 22, and even if by some chance airtightness is compromised here, the resulting negative effects would be less than when airtightness is compromised at the joint portion.

Continuing after implementing the fifth workable hardening step, which is the last workable hardening step, a solvent elimination and hardening step is implemented (FIG. 24, step S19). Thus the solvent elimination and hardening step is carried out after the adhesive application step and the workable hardening step are repeated several times. In the solvent elimination hardening step, a dehydration condensation reaction is carried out in the workable hardening step, residual moisture is further vaporized from the fully hardened ceramic adhesive layers, and drying is applied until a state is reached at which the assembly can withstand the temperature rise in the solid oxide fuel cell apparatus 1 startup procedure. In the embodiment, the solvent elimination and hardening step is implemented by maintaining a temperature inside the drying oven 116 of approximately 150° C. for approximately 180 minutes. By implementing the solvent elimination and hardening step at a temperature higher than the workable hardening step, the ceramic adhesive layer can be dried in a short period of time to a state capable of withstanding the temperature rise in the startup state.

It is thus desirable to execute the solvent elimination and hardening step at a temperature higher than the workable hardening step and lower then during the electrical generation operation by solid oxide fuel cell apparatus 1. The ceramic adhesive used in the embodiment can be dried at a temperature of 200° C. or below to a state capable of withstanding the temperature rise at the startup procedure, and the solvent elimination and hardening step is preferably executed at a temperature equal to or greater than 100° C. and less than or equal to 200° C. The ceramic adhesive used in the embodiment can be dried at a temperature of 200° C. or below to a state capable of withstanding the temperature rise at the startup procedure, and the solvent elimination and hardening step is preferably executed at a temperature equal to or greater than 100° C. and less than or equal to 200° C.

Ceramic adhesive filled in during the adhesive application step then passes through at least one workable hardening step, therefore even if the temperature of the drying oven 116 is raised to approximately 150° C. in the solvent elimination and hardening step, no large cracks will occur in the ceramic adhesive layer. Note that even after completion of the solvent elimination and hardening step, there is moisture remaining in each of the ceramic adhesive layers, but since this is a minute amount, problems such as cracking do not occur even if the temperature inside fuel cell module 2 climbs to the electrical generation temperature level. Also, in the embodiment the solvent elimination and hardening step is carried out only once after multiple repetitions of the adhesive application step and the workable hardening step, and then a final workable hardening step, are executed, but it is also possible to implement the solvent elimination and hardening step multiple times during the manufacturing process.

As a variant example, a solvent elimination and hardening step can also be added between the workable hardening step S1 and step S16 in FIG. 24. In this variant example, the added solvent elimination and hardening step is carried out by dividing into two iterations: a first solvent elimination and hardening step, and a second solvent elimination and hardening step.

Figure 28:
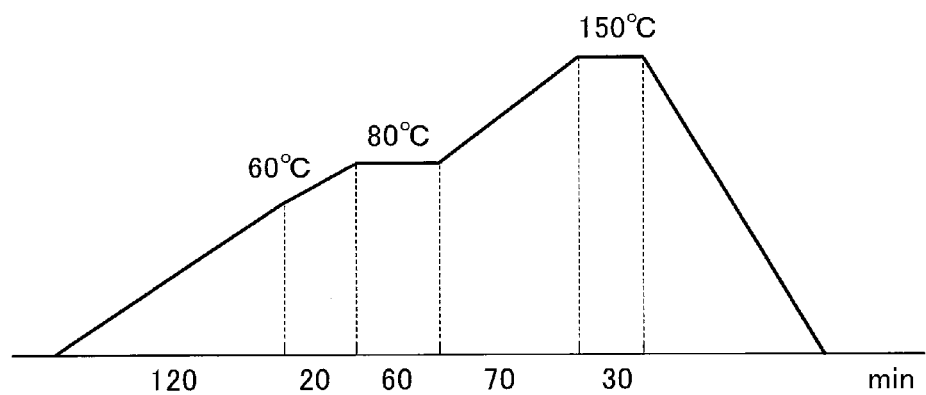
FIG. 28 is a diagram showing a first solvent removal and hardening step in a variant example of a solid oxide fuel cell according to an embodiment of the invention.
Figure 29:
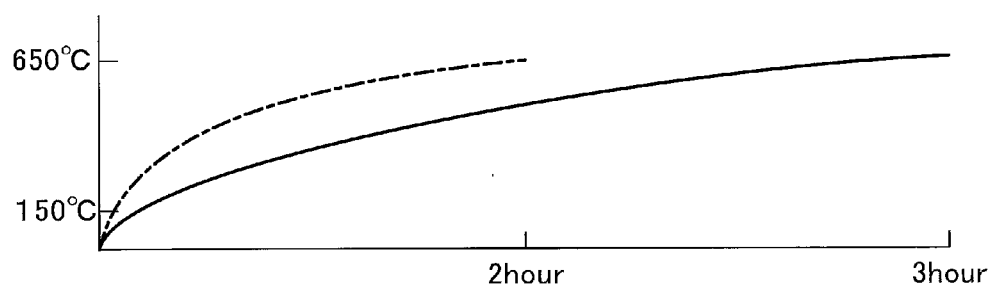
FIG. 29 is a diagram showing a second solvent removal and hardening step in a variant example of a solid oxide fuel cell according to an embodiment of the invention.
Figure 30:
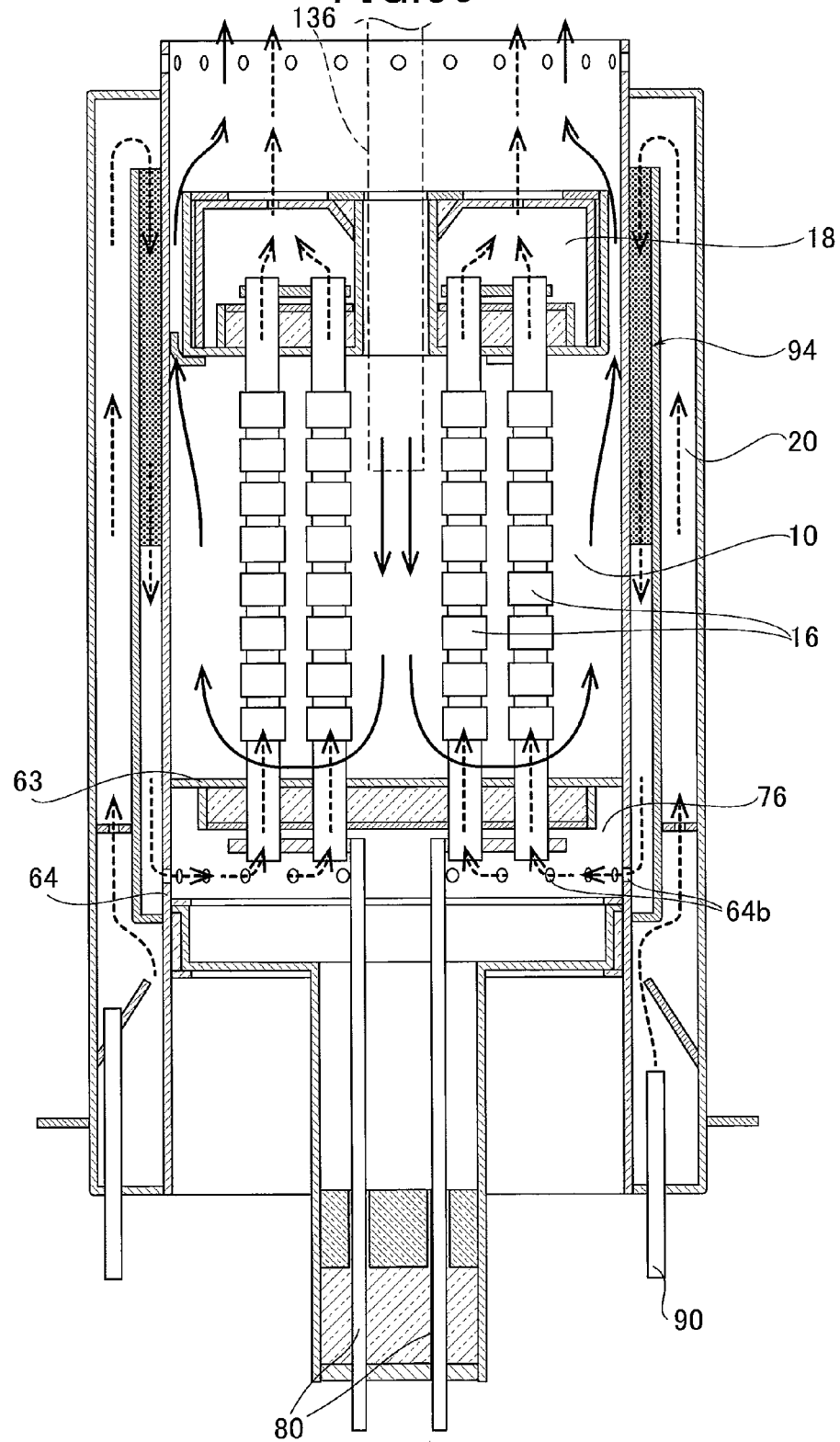
FIG. 30 is a diagram explaining a heating method in a second solvent elimination and hardening step.

FIGS. 28 through 30 are diagrams explaining the solvent elimination and hardening step according to this variant example. FIG. 28 is a diagram showing a first solvent elimination and hardening step, and FIG. 29 is a diagram showing a second solvent elimination and hardening step in this variant example. FIG. 30 is a diagram explaining the method of heating in a second solvent elimination and hardening step.

First, when implementing the manufacturing method of this variant example, the heating in the first half of FIG. 28 is carried out as the fourth workable hardening step in FIG. 24, step S15. That is, the assembly as assembled up through step S14 is placed into drying oven 116, and the temperature inside drying oven 116 is maintained at approximately 80° C. for approximately 60 minutes. Next, as shown in FIG. 28, as a first solvent elimination and hardening step the temperature inside drying oven 116 is raised to approximately 150° C. in approximately 70 minutes, and after this temperature is maintained for approximately 30 minutes, the temperature is reduced. In this first solvent elimination and hardening step the temperature is raised to approximately 150° C., but since each ceramic adhesive passes through at least one iteration of the solvent elimination and hardening step, no large cracks in the ceramic adhesive layers are produced by this heating.

Next, the second solvent elimination and hardening step shown in FIG. 29 is implemented. In this second solvent elimination and hardening step, the temperature inside generating chamber 10 and of the fuel cells 16 rises to the temperature at the time of electrical generation operation, or close to that temperature. In the second solvent elimination and hardening step, heating of the assembly is not done inside the drying oven 116 but rather, as shown in FIG. 30, by feeding heated air into generating chamber 10 to heat the interior of generating chamber 10 and the fuel cells 16. That is, in the second solvent elimination and hardening step, heated air introduction pipe 136 is inserted into generating chamber 10 through the opening portion at the center of exhaust collection chamber 18. In the second solvent elimination and hardening step, heated air is introduced into generating chamber 10 through heated air introduction pipe 136. The introduced air, as shown by the solid line arrow in FIG. 30, heats each of the fuel cells 16 in generating chamber 10, then passes through the gap between the outer circumference of exhaust collection chamber 18 and the inner circumferential wall of inside cylindrical member 64 and flows to the outside of the assembly. Each of the ceramic adhesive layers at the joint portion of the fuel cells 16 and the first affixing member 63, the joint portion of the collection chamber lower member 18b and the fuel cells 16, the joint portion of the collection chamber upper member 18a and the collection chamber lower member 18b, and the joint portion of the dispersion chamber bottom member 72 and the inside cylindrical member 64 are heated, and solvent remaining within the hardened ceramic adhesive is further vaporized.

The temperature of air introduced into generating chamber 10 through heated air introduction pipe 136 is raised a little at a time over a long period of time up to the temperature at which solid oxide fuel cell apparatus 1 can generate electricity. In this variant example, as shown by the solid line in FIG. 29, the temperature of heated air introduced from heated air introduction pipe 136 is raised to approximately 650° C. over approximately 3 hours from the start of introduction. This temperature rise is made more gradual than the temperature rise in generating chamber 10 during the solid oxide fuel cell apparatus 1 startup procedure shown by the single dot and dash line in FIG. 29. In the example shown in FIG. 29, the temperature inside generating chamber 10 is raised to approximately 650° C. in approximately 2 hours, whereas in the second solvent elimination and hardening step, the temperature of the supplied air is raised to approximately 650° C. in approximately 3 hours.

By thus gradually raising the temperature, the solvent remaining in the ceramic adhesive layer is heated a little at a time and vaporized. The occurrence of excessive cracks due to sudden volumetric expansion and vaporization of the solvent is thus suppressed. Also, in the second solvent elimination and hardening step the temperature of each of the ceramic adhesive layers in the generating chamber 10 is raised up to the actual temperature during electrical generation operation. As a result, even if the temperature of a finished solid oxide fuel cell apparatus 1 is suddenly raised during the startup procedure, the absence of excessive cracking in the ceramic adhesive layer can be more reliably assured.

Also the second solvent elimination and hardening step, in which the temperature inside the generating chamber 10 is raised to approximately 650° C., can be implemented at the end of step S15 rather than at the end of the assembly process (after FIG. 24, step S18), thereby simplifying the assembly step. That is, it is possible to pre-attach combustion catalyst 60, ignition heater 62, sheath heater 61, and devices such as sensors to the inside cylindrical container 68 and external cylindrical container 70 assembled in step S16, so that these devices can be assembled in a single pass at the same time that inside cylindrical container 68 and external cylindrical container 70 are being attached. However these devices cannot withstand a temperature of approximately 650° C. (during actual electrical generation operation of solid oxide fuel cell apparatus 1, the locations where these devices are attached do not rise to a temperature of approximately 650° C.). Therefore if the second solvent elimination and hardening step is implemented after completion of the attachment of inside cylindrical container 68 and external cylindrical container 70 (after step S18 in FIG. 24), it becomes necessary to separately attach devices such as the ignition heater 62, etc. later on, thereby complicating the manufacturing process.

On the other hand in the second solvent elimination and hardening step inert gas is introduced from fuel gas supply pipe 90 in parallel with the introduction of heated air from heated air introduction pipe 136. As indicated by the dotted arrow in FIG. 30, inert gas supplied from fuel gas supply pipe 90 rises to the top end within fuel gas supply flow path 20, then drops down through reforming section 94, passes through the small holes 64b formed in the lower portion of inside cylindrical member 64, and flows into fuel gas dispersion chamber 76. Inert gas which has flowed into fuel gas dispersion chamber 76 flows through the inside (the fuel electrode side) of each of the individual fuel cell units 16 attached to first affixing member 63 of fuel gas dispersion chamber 76 and into exhaust collection chamber 18. Inert gas which has flowed into exhaust collection chamber 18 is jetted out from jet openings 18*d* in exhaust collection chamber 18 and flows out to the outside of the assembly.

In this variant example, nitrogen gas is used as the inert gas. The introduced nitrogen gas is heated so as to be able to heat the interior of each of the fuel cells 16. In this way, inert gas is introduced into each of the fuel cells 16, and the oxidant gas (air) in each of the fuel cells 16 and the reforming section 94 is thereby discharged. Oxidation of the fuel electrodes in each of the fuel cells 16 and oxidation of the reforming catalyst in reforming section 94 when the temperature is raised during the electrical generation operation can thus be prevented. Also, in the second solvent elimination and hardening step, hydrogen gas maybe supplied from the fuel gas supply pipe 90 instead of inert gas. In such cases, the hydrogen gas passes over the fuel electrode side in each of the fuel cells 16, which have been raised to a high-temperature, therefore the fuel electrodes can be reduced. Note that in the second solvent elimination and hardening step, inert gas is supplied until the temperature in each of the fuel cells 16 has risen sufficiently, and after the temperature has risen, inert gas is switched over to hydrogen gas.

Note that in this variant example it is possible after the first solvent elimination and hardening step to raise the temperature up to the temperature of the second solvent elimination and hardening step without reducing the temperature. In this case as well it is necessary to supply inner gas from fuel gas supply pipe 90. Of the first and second solvent elimination and hardening steps, it is possible to eliminate the first solvent elimination and hardening step. In such cases, the rise in the temperature of supplied heated air is made even more gradual during the second solvent elimination and hardening step; it is desirable to raise the temperature over 4 or more hours.

In a state in which oxidant gas is supplied to the air electrode side of each of the fuel cells 16, hydrogen gas is supplied to the fuel efficiency side, and the temperature of each of the fuel cells 16 is sufficiently raised, a voltage is generated between the two bus bars 80 connected to fuel cells 16. By measuring the voltage between these bus bars 80, a determination can be made as to the go/no go status of the joint portions of each of the fuel cells 16 and the assembly. The measurement of voltage is carried out with no current flowing between the bus bars 80. When there is a problem in the fuel cells 16 themselves, the voltage produced between bus bars 80 drops. Also, if a large fuel leak occurs at the joint portion between each of the fuel cells 16 and the first affixing member 63, or at the joint portion between each of the fuel cells 16 and the collection chamber lower member 18*b*, sufficient fuel gas is not supplied to the fuel electrode, so the voltage drops. Thus in the second solvent elimination and hardening step, reduction of the fuel electrodes on each of the fuel cells 16 and inspection of the semi-finished solid oxide fuel cell apparatus 1 product can be accomplished simultaneously.

It is also possible to change the time for the workable hardening step set in this embodiment. For example the time for the initially implemented workable hardening step could be made shorter than the time for subsequently performed workable hardening steps. The joint portion on which the workable hardening step is performed at the beginning is treated to a greater number of iterations of workable hardening steps than subsequently treated joint portions, therefore the risk of cracking can be sufficiently reduced while shortening the time required for the workable hardening step.

After fuel cell housing container 8 is completed by the above-described manufacturing processes, various parts are attached to complete a solid oxide fuel cell apparatus 1. The lower fixture 110 (first positioning apparatus), upper fixture 112 (second positioning apparatus), adhesive injection apparatus 114, drying oven 116, and heating controller 116*a* constitute the manufacturing equipment for a solid oxide fuel apparatus used in the above-described manufacturing method for solid oxide fuel cell apparatus 1.

Using the manufacturing method for a solid oxide fuel cell apparatus 1 of an embodiment of the invention, ceramic adhesive applied in the adhesive application steps (FIGS. 10, 13, 17, 21, and steps S4, S7, S11, S14, S17 in FIG. 24) is hardened in the workable hardening steps (FIGS. 12, 14 and steps S6, S8, S13, S15, S18 in FIG. 24). Following the completion of all workable hardening steps, the ceramic adhesive is hardened to a state capable of implementing the next manufacturing process, but is in a state such that cracks can develop when the fully assembled solid oxide fuel cell apparatus 1 is operated. Thus the workable hardening steps provide hardening sufficient for implementing the next manufacturing process, but drying is such that cracking can occur in operation, so the time required for manufacturing processes can be shortened. In addition, after repeating the adhesive application steps and workable hardening steps, drying can be simultaneously accomplished by the solvent elimination and hardening step (FIG. 24, step S19; FIG. 26, dotted line), up to a state capable of withstanding the temperature rise in the startup procedure, therefore airtight joining of constituent members can be accomplished while reducing the time required for manufacturing.

Using the manufacturing method for solid oxide fuel cell apparatus 1 of the embodiment, the solvent elimination and hardening step (FIG. 24, step S19) is implemented just once after the last-implemented workable hardening step (FIG. 24, step S18), therefore all joint portions (ceramic adhesive layers 118, 120*a*, 120*b*, 122, 124, 128, 132) can be dried in a single iteration of the solvent elimination and hardening step to a state capable of withstanding the temperatures during electrical generation, and time required for manufacturing can be greatly shortened.

Moreover, using the manufacturing method for solid oxide fuel cell apparatus 1 of the embodiment, the solvent elimination and hardening step (FIG. 24, step S19) dries the ceramic adhesive at a higher temperature than the workable hardening step (FIG. 26), and thus can in a short time dry the ceramic adhesive to a state capable of withstanding the temperature rise in the startup procedure.

Also, using the manufacturing method for a solid oxide fuel cell apparatus 1 of the embodiment, the solvent elimination and hardening step (FIG. 24, step S19) is conducted at a temperature higher than the workable hardening step (FIG. 24, steps S6, S8, S13, S15, S18) and lower than the temperature during electrical generation (FIG. 26), therefore the time required for the solvent elimination and hardening step can be shortened while sufficiently reducing the risk of cracking in the solvent elimination and hardening step.

In addition, using the manufacturing method for solid oxide fuel cell apparatus 1 of the embodiment, ceramic adhesive is dried (FIG. 26) at 150° C. in the solvent elimination and hardening step (FIG. 24, step S19), the solvent elimination and hardening step can also be applied to a solid oxide fuel cell apparatus 1 assembly into which a reforming catalyst 96 has been built, without oxidizing that reforming catalyst 96.

Using the manufacturing method for solid oxide fuel cell apparatus 1 of the embodiment, ceramic adhesive subjected to a dehydration condensation reaction at 200° C. or below is used, therefore even with the reforming catalyst installed, the solvent elimination and hardening step (FIG. 24, step S19) can be applied to the ceramic adhesive.

Using a manufacturing apparatus for a solid oxide fuel cell apparatus 1 according to an embodiment of the invention, a solid oxide fuel cell apparatus can be manufactured in a relatively short time while sufficiently reducing the risk of cracking in a ceramic adhesive.

Using the manufacturing method for a solid oxide fuel cell apparatus 1 according to an embodiment of the invention, the workable hardening step (FIG. 24, steps S13, S18) is implemented on joint portions other than cell joint portions (the joint portion between inside cylindrical member 64 and dispersion chamber bottom member 72 and the joint portion between external cylindrical member 66 and inside cylindrical container 68) after the workable hardening steps (FIG. 24, steps S6, S8) on the cell joint portions for which it is extremely important to secure airtightness (the joint portion between fuel cells 16 and first affixing member 63, and the joint portion between fuel cells 16 and collection chamber lower member 18*b*). As a result, at least 3 iterations of the workable hardening step are applied to cell joint portions, and the risk of cracking in ceramic adhesive layers 118 and 122 in joint portions can be extraordinarily reduced without extending the time required for assembly.

Also, using the manufacturing method for a solid oxide fuel cell apparatus 1 of the present embodiment, the workable hardening step on joint portions other than cell joint portions (FIG. 24, steps S13, S15, S18) is implemented 3 times (on the joint portion between inside cylindrical member 64 and dispersion chamber bottom member 72, the joint portion between collection chamber upper member 18*a* and collection chamber lower member 18*b*, and the joint portion between external cylindrical member 66 and inside cylindrical container 68) after the last workable hardening step (FIG. 24, step S8) on a cell joint portion (the joint portion between fuel cells 16 and first affixing member 63), therefore workable hardening steps are performed at least 4 times on cell joint portions, and the risk of cracking in cell joint portions can be made extremely small.

In addition, using the manufacturing method for a solid oxide fuel cell apparatus 1 of the present embodiment, the workable hardening step (FIG. 24, step S6) on the cell joint portion (the joint portion between fuel cells 16 and collection chamber lower member 18*b*) is the first executed, therefore a large number of workable hardening steps are applied to the first-joined joint portion, and the risk of cracking in that cell joint portion can be made extremely small.

Using the manufacturing method for solid oxide fuel cell apparatus 1 of the embodiment, the solvent elimination and hardening step (FIG. 24, step S19) is implemented just once, therefore all ceramic adhesive layers hardened in multiple workable hardening steps (FIG. 24, steps S6, S8, S13, S15, S18) to a state capable of implementing the next manufacturing process can be dried in a single solvent elimination and hardening step to a state capable of withstanding the temperatures of the startup procedure, and the time required for manufacturing can be greatly reduced.

In addition, in the manufacturing method for solid oxide fuel cell apparatus 1 of the embodiment, a workable hardening step (FIG. 24, step S18) on the joint portion with constituent members forming the exhaust gas discharge flow path 21 for guiding exhaust gas (the joint portion between external cylindrical member 66 and inside cylindrical container 68) is implemented after the last-implemented workable hardening step (FIG. 24, step S8) on the cell joint portion. In this joint portion, if cracking does occur in a ceramic adhesive layer, no degradation of fuel cells 16 or extraordinary decline in performance is induced, even if airtightness is insufficient, and the time required for manufacturing can be shortened while avoiding major problems.

Also, using the solid oxide fuel cell apparatus 1 of the embodiment, fuel cells 16 are affixed by ceramic adhesive to the first affixing member 63 on the innermost side of fuel cell module 2; on the outside of this a fuel gas supply flow path 20 is formed, and a flow path for discharging exhaust gas is formed by affixing inside cylindrical container 68 to the outside of that flow path using ceramic adhesive (FIG. 2). By assembling fuel cell module 2 from the inside using ceramic adhesive, the workable hardening step (FIG. 24, step S8) is implemented at the beginning on the joint portion between fuel cells 16 and first affixing member 63, and adhesion by ceramic adhesive of the inside cylindrical container 68 to the outside thereof is implemented later (FIG. 24, step S18). Using the solid oxide fuel cell apparatus 1 of the embodiment thus constituted, at least 4 ceramic adhesive hardening steps are implemented on the cell joint portion where airtightness is particularly important, while an efficient fuel cell module 2 assembly procedure is executed so that efficient assembly and securing of sufficient airtightness can both be achieved.

In addition, in the manufacturing method for solid oxide fuel cell apparatus 1 of the embodiment, heating controller 116*a* executes a workable hardening step on the cell joint portion (FIG. 24, step S6, S8), then a subsequent solvent elimination and hardening step on joint portions other than cell joint portions (FIG. 24, step S13, S15, S18), and a solvent elimination and hardening step on hardened ceramic adhesive (FIG. 24, step S19). As a result, multiple iterations of the workable hardening step can be applied to cell joint portions, the solvent elimination and hardening step can be implemented at the same time on multiple joint portions, and the risk of cracking in ceramic adhesive layers 118 and 122 in joint portions can be extraordinarily reduced without extending the time required for assembly.

We have explained above a preferred embodiment of the invention, but various changes may be made to the above-described embodiment.

In particular, in the above-described embodiment the workable hardening steps on each joint portion were implemented in the sequence of the joint portion between collection chamber lower member 18*b* and fuel cells 16, the joint portion between fuel cells 16 and first affixing member 63, the joint portion between collection chamber upper member 18*a* and collection chamber lower member 18*b*, the joint portion between dispersion chamber bottom member 72 and inside cylindrical member 64, and the joint portion between external cylindrical member 66 and inside cylindrical container 68, but as a variant example the invention can be constituted so that joining begins from the bottom end of the fuel cells.

In the case above, the workable hardening step is performed the first time on the joint portion between fuel cells 16 and first affixing member 63, the second time on the joint portion between collection chamber lower member 18*b* and fuel cells 16, the third time on the joint portion between collection chamber upper member 18*a* and collection chamber lower member 18b, the fourth time on the joint portion between dispersion chamber bottom member 72 and inside cylindrical member 64, and the fifth time on the joint portion between external cylindrical member 66 and inside cylindrical container 68. In this variant example, the workable hardening step on the cell joint portion between fuel cells and other constituent members is implemented in the first and second iterations, which is the first half of the 5 iterations of the workable hardening step. Thus the largest number of workable hardening steps is implemented on the cell joint portions for which airtightness is particularly important, and airtightness at the cell joint portion can be reliably secured.

What is claimed is:

1. A method for manufacturing a solid oxide fuel cell apparatus for generating electricity by supplying fuel and oxidant gas to fuel cells housed in a fuel cell module, comprising steps of:
    an adhesive application step for applying ceramic adhesive to joint portions of constituent members so that flow path carrying fuel or oxidant gas inside the fuel cell module are formed in an airtight manner; and
    a drying and hardening step for drying the applied ceramic adhesive;
    wherein the drying and hardening step includes:
    a workable hardening step for hardening the applied ceramic adhesive to a state capable of implementing a next manufacturing process;
    a solvent elimination and hardening step which is conducted after multiple repetitions of the adhesive application step and the workable hardening step, wherein in the solvent elimination and hardening step, solvent remaining within the ceramic adhesive are further eliminated and hardened from the ceramic adhesive which was hardened in all the workable hardening steps, and are dried to a state capable of withstanding the temperature rise in a startup procedure in which a temperature of the fuel cells is raised to a temperature at which electricity can be generated; and
    wherein the solvent elimination and hardening step dries the ceramic adhesive at a temperature higher than a temperature at which the workable hardening step hardens the ceramic adhesive.

2. The manufacturing method according to claim 1, wherein the solvent elimination and hardening step dries ceramic adhesive at a temperature higher than the workable hardening step and lower than a temperature inside the fuel cell module during electrical generation operation.

3. The manufacturing method according to claim 2, wherein the solvent elimination and hardening step dries ceramic adhesive at a temperature between 100° C. and 200° C.

4. The manufacturing method according to claim 1, wherein the solvent elimination and hardening step has a drying temperature higher than the workable hardening steps, and raises the temperature to a first temperature greater than or equal to the temperature inside the fuel cell module during electrical generation operation, and rising of a temperature up to the first temperature is accomplished by spending more time than when reaching the first temperature during the startup procedure in normal operation.

5. The manufacturing method according to claim 1, wherein, among the multiple implementations of the workable hardening steps, the workable hardening step implemented at an early time point is shorter in duration than the subsequently implemented workable hardening steps.

6. The manufacturing method according to claim 1, wherein the workable hardening steps are implemented on a cell joint portion between the fuel cells and other constituent member, and on the joint portion between the constituent members other than fuel cells, and wherein the workable hardening step with respect to the joint portion between the constituent members other than fuel cells is implemented after the workable hardening step with respect to the cell joint portion so that multiple of the workable hardening steps are applied on the cell joint portion.

7. The manufacturing method according to claim 6, wherein the workable hardening step on the joint portion of constituent members other than fuel cells is performed at least twice, after the last-implemented workable hardening step on the cell joint portion.

8. The manufacturing method according to claim 7, wherein the workable hardening step on the cell joint portion is executed during the first half of the multiple iterations of workable hardening steps.

9. The manufacturing method according to claim 8, wherein the workable hardening step on the cell joint portion is executed at the start of the multiple iterations of workable hardening steps.

10. The manufacturing method according to claim 6, wherein the solvent elimination and hardening step is executed only once, after the last-executed workable hardening step.

11. The manufacturing method according to claim 7, wherein the workable hardening step implemented later than the last-implemented workable hardening step on the cell joint portion is the workable hardening step on constituent members forming flow path carrying oxidant gas or exhaust gas.

* * * * *